United States Patent
Zhang

(10) Patent No.: US 12,470,515 B2
(45) Date of Patent: Nov. 11, 2025

(54) DATA PROCESSING METHOD, NETWORK ELEMENT DEVICE AND READABLE STORAGE MEDIUM

(71) Applicant: Tencent Technology (Shenzhen) Company Limited, Guangdong (CN)

(72) Inventor: Zhuoyun Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 361 days.

(21) Appl. No.: 18/202,696

(22) Filed: May 26, 2023

(65) Prior Publication Data

US 2023/0300106 A1 Sep. 21, 2023

Related U.S. Application Data

(63) Continuation of application No. PCT/CN2022/102058, filed on Jun. 28, 2022.

(30) Foreign Application Priority Data

Jul. 21, 2021 (CN) .......................... 202110827622.1

(51) Int. Cl.
*H04L 61/4511* (2022.01)
*H04W 48/18* (2009.01)

(52) U.S. Cl.
CPC .......... *H04L 61/4511* (2022.05); *H04W 48/18* (2013.01)

(58) Field of Classification Search
CPC ... H04L 61/4511; H04L 67/141; H04L 67/51; H04L 51/58; H04L 51/00; H04W 48/18; Y02D 30/00
See application file for complete search history.

(56) References Cited

U.S. PATENT DOCUMENTS

2022/0321475 A1* 10/2022 Thiebaut ................. H04L 47/11

FOREIGN PATENT DOCUMENTS

| CN | 113114651 A | 7/2021 |
| CN | 113572864 A | 10/2021 |

(Continued)

OTHER PUBLICATIONS

International Search Report with Written Opinion issued Sep. 9, 2022 in Application No. PCT/CN2022/102058. (16 pages).

(Continued)

*Primary Examiner* — Cheikh T Ndiaye
(74) *Attorney, Agent, or Firm* — ArentFox Schiff LLP

(57) ABSTRACT

A data processing method is provided. A message handling rule set and rule activation condition information are obtained, by a session management function (SMF) of a core network. The message handling rule set includes at least one message handling rule. The message handling rule set is sent to an edge application server discovery function (EASDF) of the core network. Based on a protocol data unit (PDU) session being established, the SMF determines a valid message handling rule in the message handling rule set according to the rule activation condition information, determines a rule identifier (ID) corresponding to the valid message handling rule, and sends the determined rule ID to the EASDF. The EASDF is configured to process a domain name system (DNS) message according to the message handling rule corresponding to the determined rule ID during the PDU session.

18 Claims, 8 Drawing Sheets

(56) References Cited

FOREIGN PATENT DOCUMENTS

CN 113691969 A 11/2021
EP 4072101 A1 * 10/2022 .......... H04L 61/4511

OTHER PUBLICATIONS

Supplementary European Search Report issued Jan. 29, 2024 in Application No. 22845101.9. (10 pages).
Huawei et al: 11 Adding EASDF services 11 , 3GPP Draft; S2-2102991, 3rd Generation Partnership Project (3GPP), Mobile Competence Centre ; 650, Route Des Lucioles ; F-06921 Sophia-Antipolis Cedex ; France, vol. SA WG2, No. Elbonia; Apr. 12, 2021-Apr. 16, 2021, Apr. 17, 2021.

* cited by examiner

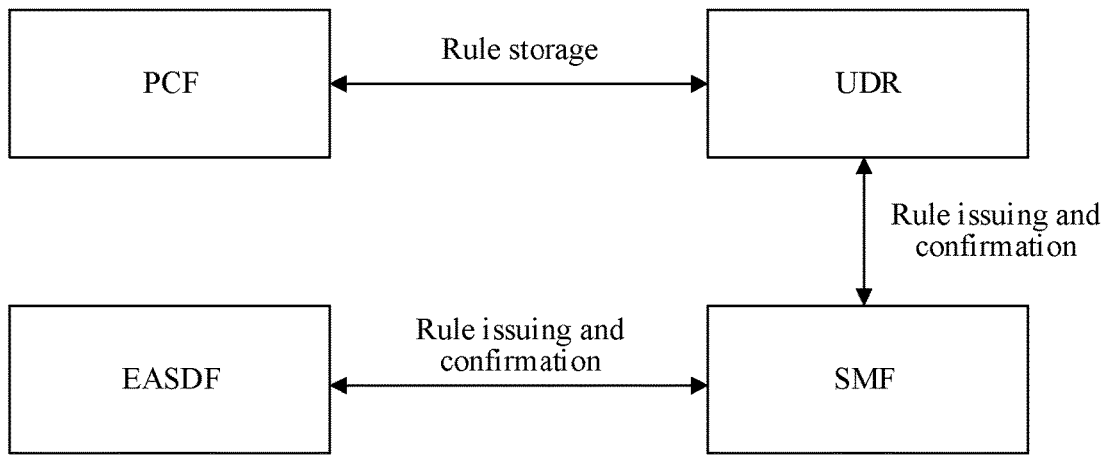

FIG. 6

| S1021 — The SMF matches, in a case that a PDU session is established, the PDU session with one or more rule activation conditions corresponding to each message handling rule in the message handling rule set, and determines the message handling rule associated with the matched rule activation condition as a valid message handling rule |

↓

| S1022 — The SMF determines a rule ID corresponding to the valid message handling rule as a valid rule ID, and transmits the valid rule ID to the EASDF |

FIG. 7

| S201 — A PCF generates a message handling rule set having a node level, and generates a rule activation condition, the message handling rule set including one or more message handling rules |

↓

| S202 — The PCF issues the message handling rule set and the rule activation condition to an SMF, whereby the SMF determines, in a case that a PDU session is subsequently established, a valid message handling rule in the message handling rule set according to the rule activation condition, determines a rule ID corresponding to the valid message handling rule as a valid rule ID, and transmits the valid rule ID to an EASDF |

↓

| S203 — The PCF issues the message handling rule set to the EASDF, whereby the EASDF handles a received DNS message according to the message handling rule corresponding to the valid rule ID during the PDU session |

FIG. 8

DATA PROCESSING METHOD, NETWORK ELEMENT DEVICE AND READABLE STORAGE MEDIUM

RELATED APPLICATIONS

The present application is a continuation of International Application No. PCT/CN2022/102058, filed on Jun. 28, 2022, which claims priority to Chinese Patent Application No. 202110827622.1, filed on Jul. 21, 2021. The entire disclosures of the prior applications are hereby incorporated by reference.

FIELD OF THE TECHNOLOGY

This application relates to the technical field of communications, including to a data processing method, a network element device, and a computer-readable storage medium.

BACKGROUND OF THE DISCLOSURE

With the popularity and rapid development of intelligent terminals, a data volume generated by a network edge increases rapidly, thereby further promoting the development of edge computing.

In a 5th generation mobile communication technology (5G) supporting edge computing, an application in a user equipment (UE) may obtain an edge application service through an edge application server (EAS). Before obtaining the edge application service, the application in the UE needs to discover an Internet protocol (IP) address of a suitable EAS. Based on a related EAS discovery mode, the IP address of the EAS is obtained by query according to a domain name system (DNS) mechanism. In this process, a session management function (SMF) in a 5G core network configures a DNS message handling rule on an edge application server discovery function (EASDF) to forward and handle a DNS message, and the rule is transmitted based on a single protocol data unit (PDU) session of a single UE. That is to say, the DNS message handling rule may be issued in each of different PDU sessions of the same UE. The DNS message handling rule may also be issued in PDU sessions of different UEs. Furthermore, during the same PDU session, each request message or response message needs to be handled by updating the DNS message handling rule via SMF and EASDF interaction. It may be seen therefrom that in the related technical solutions, the DNS message handling rule may be frequently requested and issued. Whenever a PDU session is established or a DNS request is received or a DNS response is received, requesting and issuing of the DNS message handling rule may be triggered, thus providing a complicated handling process to the EASDF, and causing low handling efficiency of DNS messages.

SUMMARY

Embodiments of this disclosure provide a data processing method, a network element device, and a non-transitory computer-readable storage medium, which can improve the handling efficiency of DNS messages.

An aspect of the embodiments of this disclosure provides a data processing method. In the method, a message handling rule set and rule activation condition information are obtained, by a session management function (SMF) of a core network. The message handling rule set includes at least one message handling rule. The message handling rule set is sent to an edge application server discovery function (EASDF) of the core network. Based on a protocol data unit (PDU) session being established, the SMF determines a valid message handling rule in the message handling rule set according to the rule activation condition information, determines a rule identifier (ID) corresponding to the valid message handling rule, and sends the determined rule ID to the EASDF. The EASDF is configured to process a domain name system (DNS) message according to the message handling rule corresponding to the determined rule ID during the PDU session.

An aspect of the embodiments of this disclosure provides a data processing method. In the method, a message handling rule set and rule activation condition information are generated by a policy control function (PCF) of a core network. The message handling rule set includes at least one message handling rule. The message handling rule set and the rule activation condition information are sent, by the PCF, to a session management function (SMF) of the core network. The SMF is configured to determine, based on a protocol data unit (PDU) session being established, a valid message handling rule in the message handling rule set according to the rule activation condition information, determine a valid rule identifier (ID) corresponding to the valid message handling rule, and send the valid rule ID to an edge application server discovery function (EASDF) of the core network. The message handling rule set is sent, by the PCF, to the EASDF. The EASDF is configured to process a domain name system (DNS) message according to the message handling rule corresponding to the valid rule ID during the PDU session.

An aspect of the embodiments of this disclosure provides a data processing method. In the method, a message handling rule set is obtained by an edge application server discovery function (EASDF) of a core network based on a session management function (SMF) of the core network being connected with the EASDF. The message handling rule set includes at least one message handling rule. A valid rule identifier (ID) is obtained, by the EASDF, from the SMF based on a protocol data unit (PDU) session being established. The valid rule ID corresponds to a valid message handling rule, and the valid message handling rule is determined from the message handling rule set by the SMF according to rule activation condition information. A target message handling rule in the at least one handling rule included in the message handling rule set is obtained, by the EASDF, according to the valid rule ID based on the EASDF receiving a domain name system (DNS) message. The DNS message is processed according to the target message handling rule.

An aspect of the embodiments of this disclosure provides a network element apparatus, including processing circuitry. The processing circuitry is configured to obtain, via a session management function (SMF) of a core network, a message handling rule set and rule activation condition information. The message handling rule set includes at least one message handling rule. The processing circuitry is configured to send the message handling rule set to an edge application server discovery function (EASDF) of the core network. Based on a protocol data unit (PDU) session being established, the processing circuitry is configured to determine, via the SMF, a valid message handling rule in the message handling rule set according to the rule activation condition information, determine a rule identifier (ID) corresponding to the valid message handling rule, and send the determined rule ID to the EASDF. The EASDF is configured to process a domain name system (DNS) message according to the message handling rule corresponding to the determined rule ID during the PDU session.

An aspect of the embodiments of this disclosure provides a network element apparatus, including processing circuitry. The processing circuitry is configured to generate, via a policy control function (PCF) of a core network, a message handling rule set and rule activation condition information. The message handling rule set includes at least one message handling rule. The processing circuitry is configured to send, via the PCF, the message handling rule set and the rule activation condition information to a session management function (SMF) of the core network. The SMF is configured to determine, based on a protocol data unit (PDU) session being established, a valid message handling rule in the message handling rule set according to the rule activation condition information, determine a valid rule identifier (ID) corresponding to the valid message handling rule, and send the valid rule ID to an edge application server discovery function (EASDF) of the core network. The processing circuitry is configured to send, via the PCF, the message handling rule set to the EASDF. The EASDF is configured to process a domain name system (DNS) message according to the message handling rule corresponding to the valid rule ID during the PDU session.

An aspect of the embodiments of this disclosure provides a network element apparatus, including processing circuitry. The processing circuitry is configured to obtain, via an edge application server discovery function (EASDF) of a core network based on a session management function (SMF) of the core network being connected with the EASDF, a message handling rule set. The message handling rule set includes at least one message handling rule. The processing circuitry is configured to obtain, by the EASDF, a valid rule identifier (ID) from the SMF based on a protocol data unit (PDU) session being established, the valid rule ID corresponding to a valid message handling rule, and the valid message handling rule being determined from the message handling rule set by the SMF according to rule activation condition information. The processing circuitry is configured to obtain, via the EASDF, a target message handling rule in the at least one handling rule included in the message handling rule set according to the valid rule ID based on the EASDF receiving a domain name system (DNS) message. The processing circuitry is configured to process the DNS message according to the target message handling rule.

An aspect of the embodiments of this disclosure provides a network element device, including: a processor, a memory and a network interface.

The processor is connected to the memory and the network interface. The network interface is configured to provide a data communication network element. The memory is configured to store a computer program. The processor is configured to invoke the computer program, whereby the network element device performs the method in the embodiments of this disclosure.

An aspect of the embodiments of this disclosure provides a non-transitory computer-readable storage medium. The non-transitory computer-readable storage medium stores instructions which when executed by at least one processor cause the at least one processor to perform any of the methods in the embodiments of this disclosure.

An aspect of the embodiments of this disclosure provides a computer program product or a computer program. The computer program product or the computer program includes computer instructions. The computer instructions are adapted to be loaded by a processor to perform the method in the embodiments of this disclosure.

In an exemplary embodiment of this disclosure, an SMF may be supported to obtain a message handling rule set having a node level, to obtain a rule activation condition, and to issue the message handling rule set to an EASDF. Then the SMF may determine a valid message handling rule according to the rule activation condition when a PDU session is established, and may transmit a valid rule ID corresponding thereto to the EASDF. Subsequently, the EASDF may handle a received DNS message according to the message handling rule corresponding to the valid rule ID during the PDU session. It may be seen therefrom that, after the SMF successfully issues the message handling rule set to the EASDF, if update of the rule is not involved, it is not necessary to trigger requesting and issuing of the message handling rule no matter how many PDU sessions are established subsequently, namely, it is not necessary to frequently issue the message handling rule for each PDU session of each UE. Furthermore, each time a PDU session is established, the SMF is triggered to perform determination based on a rule activation condition so as to select a valid message handling rule suitable for the PDU session from the message handling rule set. Therefore, the enabling of the message handling rule can be more flexible and controllable, and thus the handling efficiency of DNS messages can be improved.

BRIEF DESCRIPTION OF THE DRAWINGS

FIG. 6 is a schematic scenario diagram of a data processing method according to an embodiment of this disclosure.

FIG. 7 is a schematic flowchart of a data processing method according to an embodiment of this disclosure.

FIG. 8 is a schematic flowchart of a data processing method according to an embodiment of this disclosure.

DESCRIPTION OF EMBODIMENTS

Exemplary technical solutions in embodiments of this disclosure are described in the following with reference to the accompanying drawings. The described embodiments are merely some rather than all of the embodiments of this disclosure. Other embodiments are within the scope of this disclosure.

Figure 1:
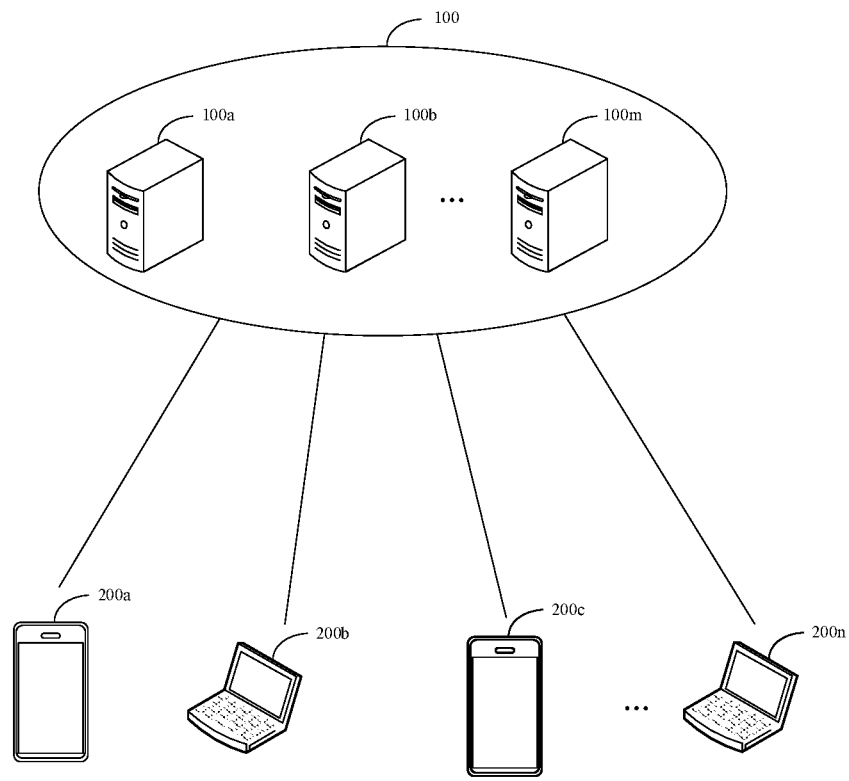
FIG. 1 is a schematic diagram of system architecture according to an embodiment of this disclosure.

FIG. 1 is a schematic diagram of system architecture according to an embodiment of this disclosure. As shown in FIG. 1, the system architecture may be applied in a service scenario that supports edge computing. Edge computing can refer to a platform that merges network, computing and storage, and application core capabilities of at a network edge side near an object or data source to provide edge intelligent services nearby to meet the needs, or the key needs, of digital industry in agile connection, real-time service, data optimization, application intelligent security, privacy protection, and the like. Edge computing enables operators and third-party services to be hosted near an access point of a UE, thereby enabling efficient service delivery by reducing end-to-end latency and load on a transmission network.

5G is a new generation of broadband mobile communication technology which can be characterized by high speed, low latency and large connection, and is a network infrastructure used to realize human-computer-things interconnection. The international telecommunications union (ITU) defines typical scenarios for 5G applications, including: enhanced mobile broadband (eMBB), ultra-reliable and low latency communication (URLLC), ultra-reliable and low latency massive machine type of communication (mMTC), vehicle to everything (V2X), and the like. On the one hand, the eMBB scenario provides a large-traffic mobile broadband service, such as high-speed downloading, high-definition video, or virtual reality (VR)/augmented reality (AR). The peak rate of these services usually exceeds 10 Gbps, and the bandwidth is required to be up to tens of Gbps, thus causing great pressure on wireless middlehaul and backhaul mobile networks. Therefore, based on these service requirements, services are required to be sunk as far as possible to the network edge, so as to achieve local shunting of the services. On the other hand, the URLLC scenario and the V2X scenario may provide ultra-high reliability and ultra-low latency communication, such as automatic driving, industrial control or telemedicine, which requires end-to-end high reliability of 99.999% and end-to-end ultra-low latency of less than 1 ms. Therefore, based on these service requirements, services are required to be sunk to the network edge, so as to reduce the network latency caused by network transmission and multi-level service forwarding.

It may be seen therefrom that the promotion of 5G increases the requirements for edge computing. Furthermore, the use of edge computing in combination with 5G can help a network encountering a sudden and continuous traffic surge to solve bandwidth, latency and security problems.

As shown in FIG. 1, the system architecture may include an edge data center 100 and a terminal cluster. The terminal cluster may include: UE 200a, UE 200b, UE 200c, UE 200n. The edge data center 100 may include multiple EASs, such as EAS 100a, EAS 100b, . . . , EAS 100m. There may be a communication connection between terminal clusters. For example, there is a communication connection between UE 200a and UE 200b, and there is a communication connection between UE 200a and UE 200n. There may be a communication connection between the EASs. For example, there is a communication connection between EAS 100a and EAS 100b. Also, any UE in the terminal cluster may have a communication connection with any EAS in the edge data center 100. For example, there is a communication connection between UE 200a and EAS 100a. The communication connection is not limited to a particular connection mode, which may be a 4G wireless access mode or a 5G wireless access mode. This disclosure is not limited herein.

In mobile communications, the system architecture as shown in FIG. 1 may further include an access network, a bearer network (transmission network) and a core network. Multiple base stations (such as a 5G base station gNodeB (gNB)) may be deployed in the access network, and are mainly responsible for the access and management of a UE at a wireless side. The bearer network may include switching and routing devices of a series of operators, and is mainly configured to transmit control signaling and user data between the base station and the core network. The core network may deploy a series of core network elements ("network elements" may also be referred to as "network functions"). These network elements cooperate to perform authentication, charging and mobility management on the UE. The access network and the bearer network are not described in detail herein.

In order to facilitate the understanding and description of the subsequent embodiments, examples of the main core network elements are first briefly introduced herein, as follows:

(1) SMF, for example, may be mainly responsible for session establishment and deletion, user plane selection and control, and UE IP address assignment, and the like. The SMF may also be referred to as a session management network element.

(2) User plane function (UPF), for example, may be mainly responsible for the routing and forwarding of data in a user plane of a mobile core network and interconnected with an external DN (such as operator service, Internet or third-party service). The UPF is a module for processing data in a 5G core network.

(3) PCF, for example, may be mainly responsible for managing network behaviors using a unified policy framework and enforcing relevant policies in conjunction with user information in a unified data repository (UDR). The PCF may also be referred to as a policy control network element.

(4) UDR, for example, may be mainly responsible for the storage and retrieval of structured services, supporting the storage and retrieval of subscription data by unified data management (UDM), supporting the storage and retrieval of policy data by the PCF, and the like. The UDR may also be referred to as a unified data storage network element.

(5) EASDF, for example, may also be referred to as an edge application server discovery network element, and the main functions thereof may include the following:
  (a) registering with a network repository function (NRF) for EASDF discovery and selection;
  (b) handling a DNS message according to an indication of the SMF, including:
  (b1) receiving a DNS message handling rule from the SMF;
  (b2) exchanging a DNS message from the UE;
  (b3) forwarding the DNS message to a central DNS (C-DNS) server or a local DNS (L-DNS) server, so as to perform DNS query;
  (b4) adding an EDNS client subnet (ECS) option to the DNS query for a fully qualified domain name (FQDN), where EDNS is extension mechanisms for DNS;

(b5) notifying the SMF of relevant information of the EASDF;

(b6) terminating DNS security if DNS over TLS (DoT, where a DNS protocol is transmitted using a TLS protocol), DNS over HTTPS (DoH, where the DNS protocol is transmitted using an HTTPS protocol), or DNS over DTLS (the DNS protocol is transmitted using a datagram transport layer security (DTLS)) is used.

The EASDF may be connected to a PDU session anchor (PSA), namely, PDU session anchor UPF through a data plane interface and may be configured to transmit the DNS message exchanged with the UE. Furthermore, multiple EASDF instances may be deployed inside one public land mobile network (PLMN), and interaction between the network functions of the 5G core network and the EASDF occurs within one PLMN.

Under the 5G network, assuming that a certain UE (such as any one of UE 200a, UE 200b, UE 200c, and UE 200n) desires to access a DN outside a mobile communication network, for example, Internet, WAP, an Intranet, or the like, the UE may initiate an access request, and a base station may forward a service stream requested thereby to a core network element UPF in the 5G core network (5G Core, which may be simply referred to as 5GC). After forwarding through the core network element UPF, the service stream is transmitted to an external DN, and other core network elements in the 5G core network are responsible for handling signaling and controlling the whole process.

Further, to obtain more efficient service delivery, edge computing may be used to meet different service requirements. In an edge computing scenario, an application service may be served by multiple EASs (such as EAS 100a, EAS 100b and EAS 100m in FIG. 1) typically deployed at different sites. These EASs bearing services may use a single IP address or different IP addresses. Typically, an application server for an application may be deployed in a central application server or in an EAS. To route a service flow of the application to the EAS, the UE needs to know an IP address of the EAS serving the application, the UE may perform discovery to obtain the IP address of a suitable EAS (for example, the nearest EAS), whereby traffic may be routed locally to the EAS, and service latencies, traffic routing paths and user service experiences may be optimized. Based on this, EAS discovery is the process in which the UE searches for the IP address of a suitable EAS using a DNS. The DNS is a service of the Internet, which serves as a distributed database mapping domain names and IP addresses to each other, whereby users can more conveniently access the Internet.

The 5G core network supports a PDU connection service between a UE and a DN. The PDU connection service is embodied in the form of a PDU session. The PDU session refers to a process of communication between the UE and the DN. That is to say, after the PDU session is established, a data transmission channel between the UE and the DN is established. UE 200a is taken as an example. Assuming that UE 200a desires to obtain a certain edge application service, UE 200a may initiate a PDU session establishment request to a core network element SMF in the 5G core network. During the establishment of a PDU session, the core network element SMF may obtain EAS deployment information through relevant policy information of the PDU session provided by the core network element PCF. Then, the core network element SMF may select the core network element EASDF according to relevant rules, and provide an address of the core network element EASDF as an address of a DNS server of the PDU session to UE 200a. Further, UE 200a may transmit a DNS query request message to the core network element EASDF. The core network element SMF may configure DNS message handling rules on the core network element EASDF, whereby the core network element EASDF forwards, when a DNS message is detected, the DNS message of UE 200a to the relevant DNS server and/or reports when the DNS message is detected. It is to be understood that the DNS message handling rules include information for DNS message detection and relevant operations. During the PDU session, the core network element SMF and the core network element EASDF may perform multiple interactions, whereby the core network element EASDF may correctly handle a DNS request and a DNS response message, and the core network element SMF may correctly establish a shunting path and set a shunting rule. Then, an IP address of the EAS may be returned to UE 200a. After receiving the IP address, UE 200a may use the IP address as a service access address to access the EAS corresponding to the IP address. Assuming that EAS 100a is finally found through the foregoing process, EAS 100a may provide a corresponding edge application service for UE 200a.

It is to be understood that, for ultra-large bandwidth services, the impact of large bandwidth on a backbone network can be greatly mitigated by the nearby deployment of mobile edge computing (such as the EAS shown in FIG. 1) to handle ultra-large bandwidth traffic nearby. Typical scenarios include, for example, live gymnasium game, live concert, mobile content delivery, and the like.

The core network element SMF may obtain a message handling rule set having a node level and a rule activation condition, and may issue the message handling rule set to the core network element EASDF. The message handling rule set may include one or more DNS message handling rules. Further, when the PDU session is established, the core network element SMF may determine a valid message handling rule in the foregoing message handling rule set according to the rule activation condition, and then the core network element EASDF may handle the received DNS message according to the valid message handling rule during the PDU session. A transmitting condition of the message handling rule set having a node level does not depend on the creation of the PDU session. That is to say, after receiving the message handling rule set, the core network element EASDF may handle the received DNS message according to the message handling rule set during all the subsequent PDU sessions if rule update is not involved. That is, the message handling rule set may be applied to the handling of all the DNS messages transmitted to the core network element EASDF without requiring the core network element SMF to frequently issue rules. In the meantime, a using condition of the rule activation condition depends on the creation of the PDU session. That is, the rule activation condition is applicable to all the PDU sessions. That is to say, each time the PDU session is established, the core network element SMF may select a valid message handling rule suitable for the PDU session from the message handling rule set according to the rule activation condition, and notify the core network element EASDF of the valid rule ID corresponding thereto, without requiring to re-issue a new DNS message handling rule.

It is to be understood that the foregoing UE which may be configured to perform edge computing may include terminal application products in the fields of civil, commercial, industrial, and the like, such as a smartphone, a tablet personal computer, a notebook computer, a palmtop computer, a mobile Internet device (MID), a wearable device (for example, a smart watch, a smart bracelet, or the like), a smart computer, a smart car, a smart home, an unmanned aerial vehicle, an automatic teller machine (ATM), a camera, a traffic light, a generator, or various types of sensors. The EAS may be an independent physical server, may also be a server cluster or distributed system composed of multiple physical servers, and may also be a cloud server providing basic cloud computing services, such as a cloud database, a cloud service, cloud computing, a cloud function, cloud storage, a network service, cloud communication, a middleware service, a domain name service, a security service, a CDN, and a large data and artificial intelligence platform. The UE and the EAS may be directly or indirectly connected in a wired or wireless manner. Embodiments of this disclosure are not limited thereto herein.

Figure 2A:
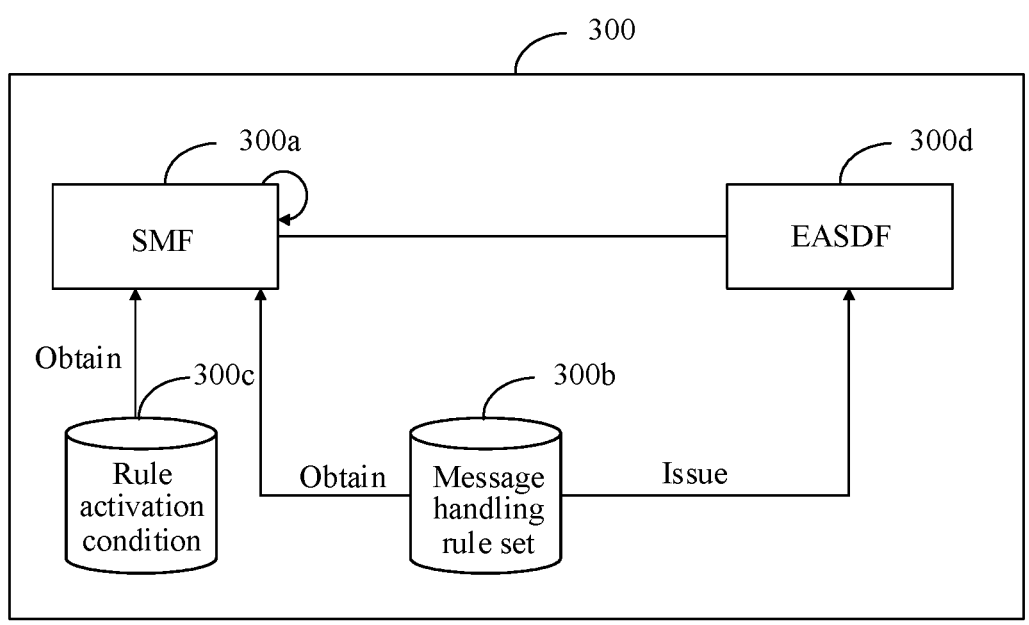
FIG. 2a to FIG. 2c are schematic scenario diagrams of a data processing method according to an embodiment of this disclosure.
Figure 2B:
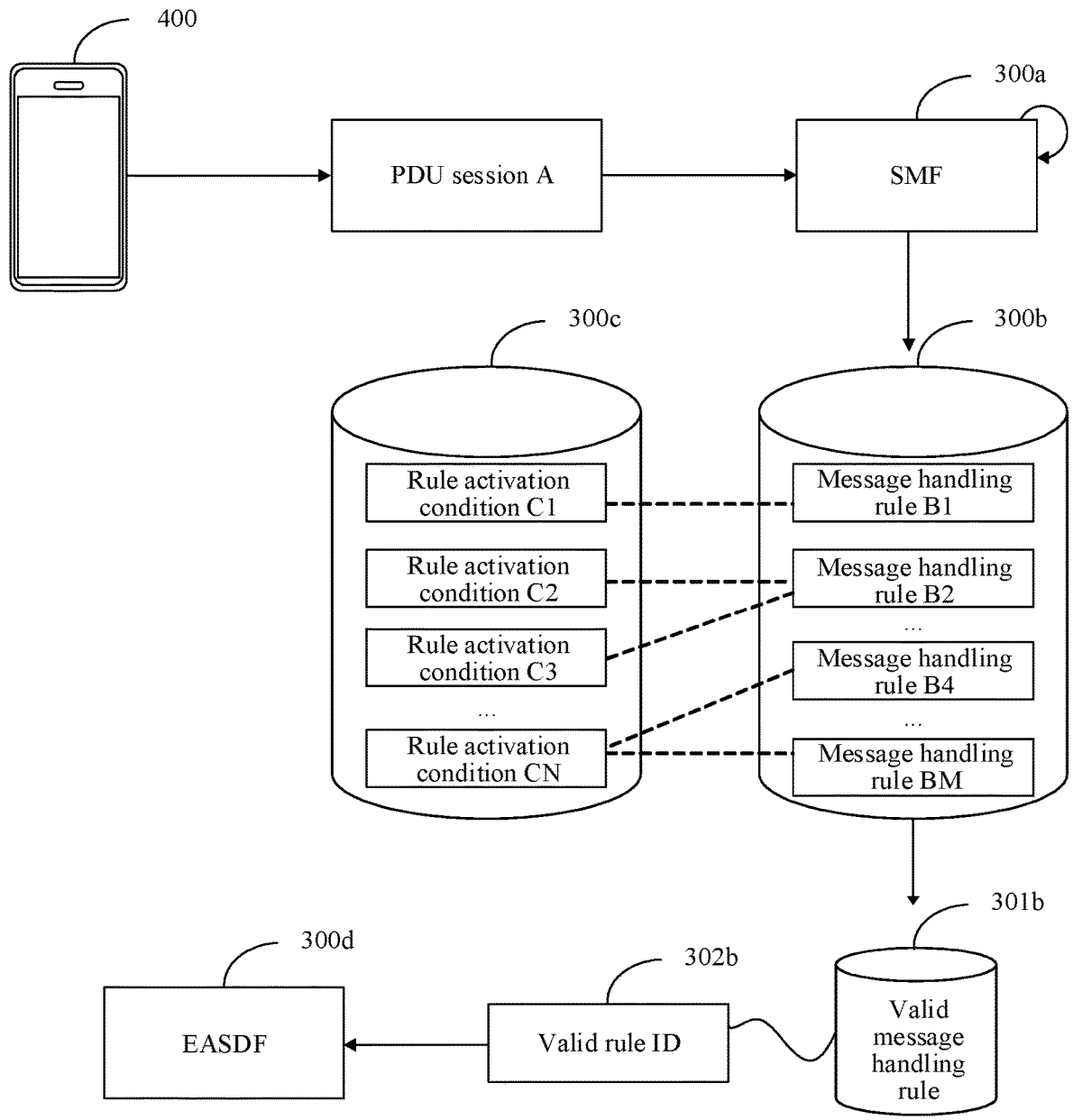
Figure 2C:
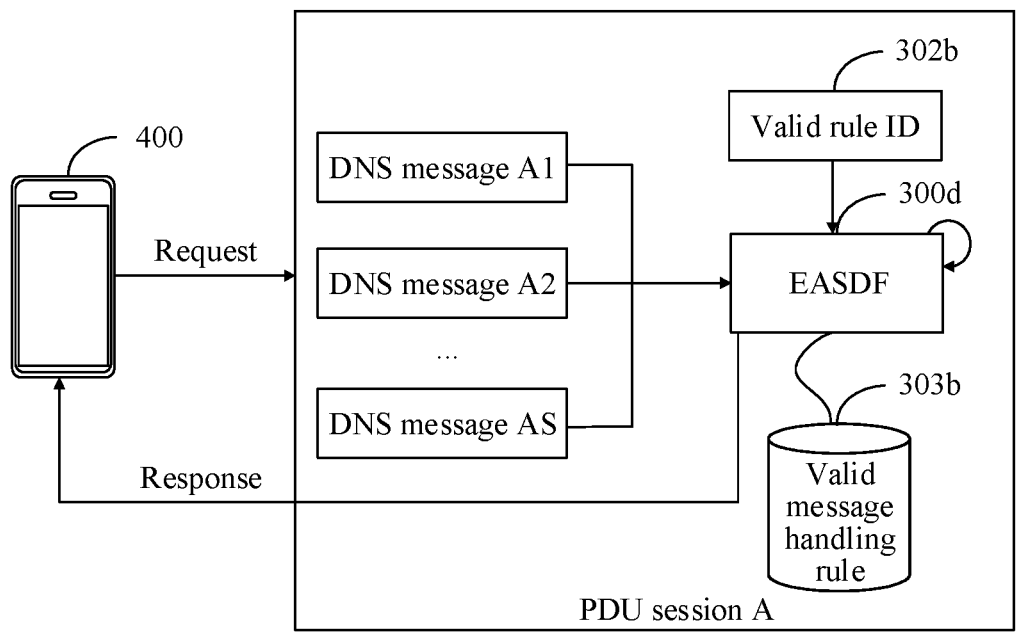

FIG. 2a to FIG. 2c are schematic scenario diagrams of a data processing method according to an embodiment of this disclosure. The implementation process of the data processing method is performed in a 5G core network, for example. As shown in FIG. 2a, in a core network 300, an SMF 300a may obtain a message handling rule set 300b and a rule activation condition 300c. The message handling rule set 300b and the rule activation condition 300c may be generated by the SMF 300a or may be generated by other core network elements (such as a PCF) in the core network 300. Embodiments of this disclosure are not limited thereto. The message handling rule set 300b may include one or more message handling rules. The rule activation condition 300c may include one or more rule activation conditions, and one message handling rule corresponds to one or more rule activation conditions. The specific number of message handling rules and rule activation conditions is not limited in this embodiment of this disclosure. When the SMF 300a is connected with an EASDF 300d, both parties may perform data interaction, for example, requesting and issuing rules. In an implementation, the SMF 300a may issue the message handling rule set 300b to the EASDF 300d.

The generation and issuing of the message handling rule may also be performed in other manners. Embodiments of this disclosure are not limited thereto. Other manners (for example, generating and issuing the message handling rule by a PCF) may be similar to the subsequent embodiments. Certainly, this disclosure also extends to other relevant or similar scenarios.

Further, after receiving the message handling rule set 300b, the EASDF 300d may use the message handling rule set 300b to handle a subsequently received DNS message, and the message handling rule set 300b is applicable to any PDU session of any UE. As stated above, in this embodiment of this disclosure, a corresponding rule activation condition will be set for each message handling rule on the SMF 300a. That is to say, the SMF 300a needs to first determine which message handling rules in the message handling rule set 300b may be specifically used by the EASDF 300d for a PDU session. Referring to FIG. 2b, this embodiment of this disclosure describes an example in which a UE initiates a PDU session. As shown in FIG. 2b, it is assumed that a UE 400 initiates a PDU session establishment request, for example, a PDU session A, to the core network 300. When the PDU session A is established, the SMF 300a may determine a valid message handling rule in the message handling rule set 300b according to the rule activation condition 300c. For example, it is assumed that the message handling rule set 300b includes M message handling rules: message handling rule B1, message handling rule B2, ..., and message handling rule BM. M is an integer greater than 1. Accordingly, the rule activation condition 300c may include N rule activation conditions (N is an integer greater than 1): rule activation condition C1, rule activation condition C2, ..., and rule activation condition CN. The message handling rule may correspond to one or more rule activation conditions, or one rule activation condition may correspond to one or more message handling rules. If message handling rule B1 corresponds to rule activation condition C1, message handling rule B2 corresponds to rule activation condition C2 or the message handling rule C3, ..., and both message handling rule B4 and message handling rule BM correspond to rule activation condition CN, the SMF 300a may match the PDU session A with rule activation condition C1, rule activation condition C2, ..., and rule activation condition CN, and then determine the message handling rule associated with the matched one or more rule activation conditions as a valid message handling rule 301b. Thereafter, the SMF 300a may determine a rule ID corresponding to the valid message handling rule 301b as a valid rule ID 302b, and may transmit the valid rule ID 302b to the EASDF 300d.

Further, after receiving the valid rule ID 302b, the EASDF 300d may handle a received DNS message according to the message handling rule corresponding to the valid rule ID 302b during the PDU session A. Referring to FIG. 2c, the EASDF 300d may determine the message handling rule corresponding to a rule ID identical to the valid rule ID 302b in the message handling rule set 300b as a valid message handling rule 303b. It is to be understood that the valid message handling rule 303b is applicable to both DNS messages in the PDU session A, and the valid message handling rule 303b is identical to the valid message handling rule 301b. For the sake of illustration, it is assumed that the valid message handling rule 303b includes multiple valid message handling rules. It is to be understood that during the PDU session A, multiple DNS messages are generated, such as DNS message A1, DNS message A2, ..., and DNS message AS (S is an integer greater than 1). These DNS messages may include a query request message type and a query response message type. For example, DNS message A1 may be a DNS query request message transmitted by the UE 400. Further, the EASDF 300d may obtain a target message handling rule suitable for each DNS message from the multiple valid message handling rules in the valid message handling rules 303b. Then the EASDF 300d may handle each DNS message according to the corresponding target message handling rule.

DNS message A1 is taken as an example. It is assumed that the valid message handling rule 303b includes T valid message handling rules: message handling rule $X_1$, message handling rule $X_2$, ..., message handling rule XT. T is an integer greater than 1. Then when receiving DNS message A1, the EASDF 300d may match DNS message A1 with the T message handling rules in the valid message handling rule 303b, and determine the matched message handling rule as a candidate message handling rule corresponding to DNS message A1. If there is one candidate message handling rule at this moment, the candidate message handling rule may be directly determined as a target message handling rule corresponding to DNS message A1. If there are multiple candidate message handling rules at this moment, a target message handling rule corresponding to DNS message A1 may be obtained from the candidate message handling rules. For example, assuming that the candidate message handling rules include message handling rule $X_1$ and message handling rule $X_2$ at this moment, the EASDF 300d may sort according to rule precedence corresponding to message handling rule $X_1$ and message handling rule $X_2$, and select the message handling rule with the highest rule precedence from the two message handling rules as the target message handling rule corresponding to DNS message A1. The target message handling rule may also be determined from the multiple candidate message handling rules in other manners. Embodiments of this disclosure are not limited thereto.

In an embodiment, when receiving DNS message A1, the EASDF 300*d* may match DNS message A1 with the T message handling rules in the valid message handling rule 303*b* in the order of precedence, namely, successively match from a message handling rule with a high precedence. When a suitable message handling rule is matched, the message handling rule is determined as a target message handling rule. The matching process ends.

Assuming that the target message handling rule determined through the foregoing steps is message handling rule $X_1$, the EASDF 300*d* may handle DNS message A1 according to a message handling operation in message handling rule $X_1$. It is to be understood that the process of handling, by the EASDF 300*d*, other received DNS messages (such as DNS message A2 and DNS message AN) may be similar or identical to the process of handling DNS message A1.

As shown in FIG. 2*c*, the EASDF 300*d* may finally transmit a DNS query response message to the UE 400. In an implementation, the DNS query response message may contain IP addresses of one or more EASs. It is to be understood that the process of handling other PDU sessions established by UE 400 or PDU sessions established by other UEs may be similar or identical to the foregoing process of handling the PDU session A.

The data processing method shown in FIG. 2*a* to FIG. 2*c* only illustrates core network elements (including the SMF and the EASDF) closely related to this embodiment of this disclosure, and other core network elements such as an access and mobility management function (AMF), a base station, or UDM may also be involved in an actual service scenario.

It may be seen therefrom that this disclosure provides a method for configuring and using a message handling rule. A message handling rule set has a node level. A transmitting condition of the message handling rule set does not depend on the creation of a PDU session. That is to say, after an SMF successfully issues the message handling rule set to an EASDF, if update of the rule is not involved, it is not necessary to trigger requesting and issuing of the message handling rule no matter how many PDU sessions are established subsequently, namely, it is not necessary to frequently issue the message handling rule for each PDU session of each UE. Furthermore, a using condition of a rule activation condition provided in this embodiment of this disclosure depends on the creation of the PDU session. That is to say, each time the PDU session is established, the SMF is triggered to perform determination based on the rule activation condition so as to select a valid message handling rule suitable for the PDU session from the message handling rule set. Therefore, the enabling of the message handling rule can be more flexible and controllable, and thus the handling efficiency of DNS messages can be improved.

Figure 3:
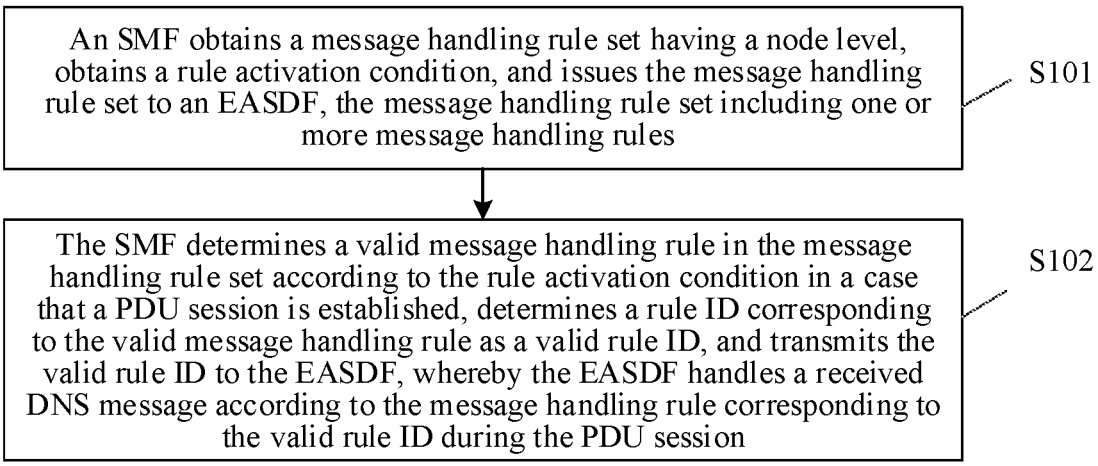
FIG. 3 is a schematic flowchart of a data processing method according to an embodiment of this disclosure.

FIG. 3 is a schematic flowchart of a data processing method according to an embodiment of this disclosure. The data processing method may be performed by an SMF. As shown in FIG. 3, the data processing method may include at least the following steps S101-S102:

In step S101, the SMF obtains a message handling rule set having a node level, obtains a rule activation condition, and issues the message handling rule set to an EASDF, the message handling rule set including one or more message handling rules.

In an example, the SMF may first obtain a message handling rule set having a node level, and may also obtain a rule activation condition. Then the message handling rule set may be issued to the EASDF. The message handling rule set includes one or more message handling rules (DNS message handling rule) with precedence, and a transmitting condition of the message handling rule set having a node level does not depend on the creation of a PDU session. The message handling rule set may be transmitted when the network element is enabled. Furthermore, the rule activation condition may be applicable to all PDU sessions.

This embodiment of this disclosure provides several manners to obtain a message handling rule set and a rule activation condition, for example as follows.

Figure 4:
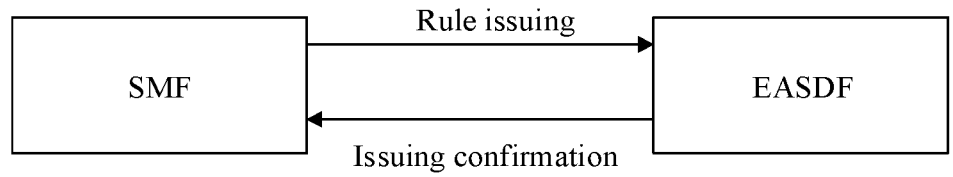
FIG. 4 is a schematic scenario diagram of a data processing method according to an embodiment of this disclosure.

In an embodiment, the SMF may obtain rule generation information, may generate one or more message handling rules with precedence according to the rule generation information, may determine the one or more message handling rules as a message handling rule set having a node level, and may also generate a rule activation condition associated with the one or more message handling rules in the message handling rule set. Further, the SMF may issue, in a case that the SMF is connected with the EASDF, the message handling rule set to the EASDF. FIG. 4 is a schematic scenario diagram of a data processing method according to an embodiment of this disclosure. As shown in FIG. 4, the message handling rule set having a node level and the rule activation condition having a session level are both generated by the SMF. When the SMF is connected to the EASDF, the SMF may issue the generated message handling rule set having a node level to the EASDF. After receiving the message handling rule set, the EASDF may transmit a response message confirming the reception to the SMF. The process of rule issuing may be defined as a service of the EASDF, or may be defined as a service of the SMF. The specific service definition for realizing the function is not limited by this embodiment of this disclosure. It is to be understood that the SMF may also store the generated message handling rule set to a UDR.

Figure 5:
FIG. 5 is a schematic scenario diagram of a data processing method according to an embodiment of this disclosure.

The SMF may transmit, in a case that the SMF is connected with the EASDF, a rule obtaining request to a PCF, whereby the PCF transmits, in response to the rule obtaining request, a message handling rule set having a node level, and transmits a rule activation condition. The message handling rule set and the rule activation condition are generated by the PCF. Further, the SMF may receive the message handling rule set and the rule activation condition transmitted by the PCF, and may then transmit the message handling rule set to the EASDF. FIG. 5 is a schematic scenario diagram of a data processing method according to an embodiment of this disclosure. As shown in FIG. 5, the PCF may obtain rule generation information, may generate one or more message handling rules with precedence according to the rule generation information, may determine the one or more message handling rules as a message handling rule set, and may also generate a rule activation condition associated with the one or more message handling rules in the message handling rule set. When the SMF is connected to the EASDF, the SMF may request the message handling rule set having a node level and request the rule activation condition from the PCF. The PCF may transmit, in response to the rule obtaining request, the message handling rule set and the rule activation condition to the SMF in a relevant response message. After receiving the message handling rule set and the rule activation condition, the SMF may transmit a response message confirming the reception to the PCF. Further, the SMF may issue the message handling rule set to the EASDF. After receiving the message handling rule set, the EASDF may transmit a response message confirming the reception to the SMF.

When the SMF is connected to the EASDF, the SMF may obtain the message handling rule set and the rule activation condition through the unified data repository and may further transmit the message handling rule set to the EASDF. The message handling rule set and the rule activation condition are generated by the PCF and stored in the UDR. FIG. 6 is a schematic scenario diagram of a data processing method according to an embodiment of this disclosure. As shown in FIG. 6, the message handling rule set having a node level and the rule activation condition having a session level are generated by the PCF. The PCF may first store the message handling rule set and the rule activation condition in the UDR. When the SMF is connected with the EASDF, the UDR may issue the message handling rule set and the rule activation condition to the SMF. After receiving the message handling rule set and the rule activation condition, the SMF may transmit a response message confirming the reception to the UDR. Further, the SMF may issue the message handling rule set to the EASDF. After receiving the message handling rule set, the EASDF may transmit a response message confirming the reception to the SMF.

The foregoing rule generation information may specifically include request information of an application function (AF) or configuration information of an operator.

Each message handling rule in the message handling rule set includes a message detection template and a message handling operation. The message detection template may specifically include one or more of a query request message detection template and a query response message detection template. The message handling operation includes, but is not limited to, one or more of a content reporting operation, a forwarding operation, a cache waiting operation, and a transmitting operation. The forwarding operation may further include an option construction operation or an address replacement operation. Furthermore, each message handling rule may also include a rule ID and rule precedence, and may further include at least one of the following: a rule level and a life cycle. The rule ID can refer to an ID for distinctively marking each message handling rule. The rule level can refer to the node level. The rule precedence can represent an order in which each message handling rule is executed. The life cycle can represent a validity time range of each message handling rule.

For example, each message handling rule may include the following:
(1) rule ID;
(2) rule level: node level, namely, the message handling rule is valid for all DNS messages on the node;
(3) precedence of the DNS message handling rule;
(4) DNS message detection template, including at least one of the following:
(a) in response to a message type of a DNS message being a query request message type (namely, DNS message type=DNS Query):
including an array for representing an FQDN range, which may include one or more FQDNs, where the one or more FQDNs in the array may be used for matching a DNS message, namely, as a query request message detection template;

(b) in response to a message type of a DNS message being a query response message type (namely, DNS message type=DNS Response):
including at least one of the following: an array representing an FQDN range and an array (which may include one or more EAS IP addresses) representing a range of an EAS IP address (namely an IP address of an EAS), where one or more FQDNs in the array or one or more EAS IP addresses may be used for matching a DNS message, namely, as a query response message detection template;
(5) executing at least one possible message handling operation, which may include:
(a) content reporting operation: reporting the content of the DNS message to the SMF, for example, which may include at least one of the following: EAS IP addresses, FQDNs, and the like parsed from the DNS message;
(b) forwarding operation: transmitting the DNS message to a pre-configured DNS server/resolver or an indicated DNS server, which may also include the following operations (the indicated DNS server is contained in the message handling rule):
(b1) option construction operation: containing information about constructing an optional ECS option in the DNS message (information about constructing the ECS option by the EASDF being contained in the message handling rule);
(b2) address replacement operation: replacing a target address of the DNS message with an indicated DNS server address; and replacing a source address of the DNS message with a specific IP address; if the SMF does not provide the DNS server address, the EASDF will forward the DNS message to the locally pre-configured DNS server/resolver;
(c) cache waiting operation: caching the DNS message, reporting the content of the DNS message to the SMF, and waiting for an instruction of the SMF;
(d) transmitting operation: sending an indicated DNS response message to the UE;
(6) life cycle, also referred to as time window: defining a validity time of the message handling rule, where the message handling rule is invalid beyond the time window.

It may be seen therefrom that the query request message detection template provided in this embodiment of this disclosure does not contain a source IP address (such as an IP address of a UE), because the solution provided in this disclosure does not involve the rule configuration at a session level, but is applicable to all sessions.

It is to be understood that the specific content of the message handling rule may be adjusted according to actual requirements, and is not limited in embodiments of this disclosure.

In step S102, the SMF determines a valid message handling rule in the message handling rule set according to the rule activation condition in a case that a PDU session is established, determines a rule ID corresponding to the valid message handling rule as a valid rule ID, and transmits the valid rule ID to the EASDF, whereby the EASDF handles a received DNS message according to the message handling rule corresponding to the valid rule ID during the PDU session.

In this embodiment of this disclosure, the SMF sets a rule activation condition having a session level for each message handling rule. That is, when the PDU session established by the UE satisfies these rule activation conditions, the corresponding message handling rules will be activated. For ease of understanding and explanation, it is assumed that the message handling rule set includes one or more message handling rules, and that one message handling rule corresponds to one or more rule activation conditions. For example, the SMF may determine, when a PDU session is established, a valid message handling rule in one or more message handling rules in the message handling rule set according to the rule activation condition, determine a rule ID corresponding to the valid message handling rule as a valid rule ID, and transmit the valid rule ID to the EASDF. Further, after receiving the valid rule ID, the EASDF may handle a received DNS message according to the message handling rule corresponding to the valid rule ID during the PDU session. That is to say, the SMF may determine the current PDU session according to the rule activation condition, and interact with the EASDF to notify the EASDF of activated message handling rule(s), namely, of message handling rule(s) valid to the PDU session. When all the rule activation conditions in the SMF are not satisfied, none of the message handling rules is activated. At this moment, the EASDF handles the DNS message according to the default message handling rule.

FIG. 7 is a schematic flowchart of a data processing method according to an embodiment of this disclosure. The data processing method may include at least step S1021 to step S1022, and step S1021 to step S1022 are exemplary implementations of step S102. As shown in FIG. 7, the data processing method may include the following steps:

In step S1021, the SMF matches, in a case that a PDU session is established, the PDU session with one or more rule activation conditions corresponding to each message handling rule in the message handling rule set, and determines the message handling rule associated with the matched rule activation condition as a valid message handling rule.

For example, the SMF may set different rule activation conditions for different message handling rules. If the rule activation condition includes single network slice selection assistance information (S-NSSAI), the SMF may obtain, in a case that a PDU session is established, a network slice ID corresponding to the PDU session, match the network slice ID with each rule activation condition containing the S-NSSAI, determine the successfully matched rule activation condition as a target rule activation condition, and determine a message handling rule associated with the target rule activation condition as a valid message handling rule. The network slice ID in this embodiment of this disclosure is, for example, S-NSSAI which needs to be carried when the UE requests to establish the PDU session. Each network slice is uniquely identified by S-NSSAI, and the S-NSSAI includes a slice/service type (SST) and a slice differentiator (SD). For a 5G wireless network, the network slice may be embodied in access control, network selection and resource separation.

If the rule activation condition includes a DNN, the SMF may obtain, in a case that a PDU session is established, a target DNN corresponding to the PDU session, match the target DNN with each rule activation condition containing the DNN, determine the successfully matched rule activation condition (for example, the rule activation condition corresponding to the DNN identical to the target DNN) as a target rule activation condition, and determine a message handling rule associated with the target rule activation condition as a valid message handling rule.

If the rule activation condition includes a session and service continuity (SSC) mode, the SMF may obtain, in a case that a PDU session is established, a target SSC mode corresponding to the PDU session, match the target SSC mode with each rule activation condition containing the SSC mode, determine the successfully matched rule activation condition (for example, the rule activation condition corresponding to the SSC mode identical to the target SSC mode) as a target rule activation condition, and determine a message handling rule associated with the target rule activation condition as a valid message handling rule. A 5G system (5GS) supports three different SSC modes, and the SSC mode of a PDU session is not changed within the whole life cycle of the PDU session.

If the rule activation condition includes user identity information, such as a subscription permanent identifier (SUPI), or an internal group ID-list, or an SUPI interval, or a generic public subscription identifier (GPSI), or a GPSI list, the SMF may obtain, in a case that a PDU session is established, target user identity information corresponding to the PDU session, match the target user identity information with each rule activation condition containing the user identity information, determine the successfully matched rule activation condition (for example, the rule activation condition containing the user identity information identical to the target user identity information) as a target rule activation condition, and determine a message handling rule associated with the target rule activation condition as a valid message handling rule. There may be one or more pieces of user identity information contained in one rule activation condition.

It is to be understood that each rule activation condition may also include any one or more of S-NSSAI, DNN, SSC mode, and user identity information. The specific content of the rule activation condition is not limited in embodiments of this disclosure.

In step S1022, the SMF determines a rule ID corresponding to the valid message handling rule as a valid rule ID, and transmits the valid rule ID to the EASDF.

For example, the SMF may determine a rule ID corresponding to the valid message handling rule as a valid rule ID, and may then transmit the valid rule ID to the EASDF. It is to be understood that there may be one or more valid message handling rules.

For example, assuming that a rule activation condition configured for a message handling rule "rule ID #1" (namely, rule ID "1") is "DNN=DNN #1", the SMF may activate the message handling rule "rule ID #1" when each PDU session for "DNN #1" is established. By the same reasoning, if a rule activation condition configured for a message handling rule "rule ID #2" (namely, rule ID "2") is "SUPI=123456789", the SMF may activate the message handling rule "rule ID #2" when a UE (SUPI=123456789) establishes a PDU session. Further, when the rule activation condition is satisfied, the SMF may transmit a valid rule ID satisfying the rule activation condition to the EASDF, and the EASDF may execute a message handling rule having the valid rule ID on the PDU session.

Embodiments of this disclosure also support update of the message handling rule set or the rule activation condition. The SMF may obtain rule update information, perform rule update on the message handling rule set according to the rule update information, and transmit the updated message handling rule set to the UDR and the EASDF. By the same reasoning, the SMF may also update the rule activation condition. The rule update information may be obtained according to a request of an AF or a configuration of an operator. The PCF may update the message handling rule set or the rule activation condition, and actively push the updated message handling rule set or the updated rule activation condition to the SMF and the UDR. When the SMF or the UDR receives the updated message handling rule set transmitted by the PCF, the updated message handling rule set may also be actively transmitted to the EASDF. It is to be understood that the EASDF may handle the subsequently received DNS message according to the updated message handling rule set, and the SMF may also perform relevant determination according to the updated rule activation condition. The rule update may issue a full-quantity message handling rule set in a full-quantity update manner, including an updated rule and a rule kept unchanged, or issue only updated content in an incremental update manner, without the need to repeat the issuing of non-updated content. The updated content may include modification or deletion of the specific content of one or more message handling rules, or addition of one or more new message handling rules to the message handling rule set, or deletion of one or more existing message handling rules.

An SMF may be supported to obtain a message handling rule set having a node level, to obtain a rule activation condition, and to issue the message handling rule set to an EASDF. Then the SMF may determine a valid message handling rule according to the rule activation condition when a PDU session is established, and may transmit a valid rule ID corresponding thereto to the EASDF. Subsequently, the EASDF may handle a received DNS message according to the message handling rule corresponding to the valid rule ID during the PDU session. It may be seen therefrom that, after the SMF successfully issues the message handling rule set to the EASDF, if update of the rule is not involved, it is not necessary to trigger requesting and issuing of the message handling rule no matter how many PDU sessions are established subsequently, namely, it is not necessary to frequently issue the message handling rule for each PDU session of each UE, thus greatly reducing the amount of interaction between the SMF and the EASDF. Furthermore, each time a PDU session is established, the SMF is triggered to perform determination based on a rule activation condition so as to select a valid message handling rule suitable for the PDU session from the message handling rule set. Therefore, the enabling of the message handling rule can be flexible and controllable, and thus the handling efficiency of DNS messages can be improved.

FIG. 8 is a schematic flowchart of a data processing method according to an embodiment of this disclosure. The data processing method may be performed by a PCF. As shown in FIG. 8, the data processing method may include at least the following steps S201-S203:

In step S201, the PCF generates a message handling rule set having a node level, and generates a rule activation condition, the message handling rule set including one or more message handling rules.

For example, the PCF may obtain rule generation information, may generate one or more message handling rules with precedence according to the rule generation information, may determine the one or more message handling rules as a message handling rule set, and may also generate a rule activation condition associated with the one or more message handling rules in the message handling rule set. The rule generation information may specifically include request information of an AF or configuration information of an operator. The message handling rule set in this embodiment of this disclosure has a node level. That is, a transmitting condition of the message handling rule set does not depend on the creation of a PDU session, and a using condition of the rule activation condition depends on the creation of the PDU session.

Each message handling rule in the message handling rule set includes a message detection template and a message handling operation. The message detection template may specifically include one or more of a query request message detection template and a query response message detection template. The message handling operation includes, but is not limited to, one or more of a content reporting operation, a forwarding operation, a cache waiting operation, and a transmitting operation. The forwarding operation may include an option construction operation or an address replacement operation. Furthermore, each message handling rule may also include a rule ID and rule precedence, and may further include at least one of the following: a rule level and a life cycle. The rule ID refers to an ID for distinctively marking each message handling rule. The rule precedence may represent an order in which each message handling rule is executed. The rule level refers to the node level. The life cycle may represent a validity time range of each message handling rule. More specific rule contents may be similar to the description of step S101 in the embodiment corresponding to FIG. 3. Each rule activation condition may include any one or more of S-NSSAI, DNN, SSC mode, and user identity information. The specific content of the rule activation condition is not limited in embodiments of this disclosure.

It is to be understood that the specific content of the message handling rule or the rule activation condition may be adjusted according to actual requirements, and is not limited in embodiments of this disclosure.

In step S202, the PCF issues the message handling rule set and the rule activation condition to an SMF, whereby the SMF determines, in a case that a PDU session is subsequently established, a valid message handling rule in the message handling rule set according to the rule activation condition, determines a rule ID corresponding to the valid message handling rule as a valid rule ID, and transmits the valid rule ID to an EASDF.

Figure 9:
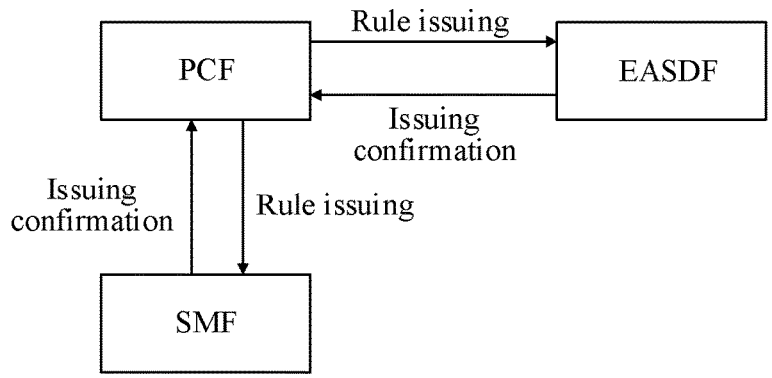
FIG. 9 is a schematic scenario diagram of a data processing method according to an embodiment of this disclosure.

For example, the PCF may issue the message handling rule set and the rule activation condition to the SMF. FIG. 9 is a schematic scenario diagram of a data processing method according to an embodiment of this disclosure. As shown in FIG. 9, the message handling rule set and the rule activation condition are generated by the PCF. When the SMF is connected to the EASDF, the SMF may request the message handling rule set having a node level from the PCF. The PCF may transmit, in response to the rule obtaining request, the message handling rule set and the rule activation condition to the SMF in a relevant response message. After receiving the message handling rule set and the rule activation condition, the SMF may transmit a response message confirming the reception to the PCF.

Further, the SMF may determine, when a PDU session is subsequently established, a valid message handling rule in the message handling rule set according to the rule activation condition, determine a rule ID corresponding to the valid message handling rule as a valid rule ID, and then transmit the valid rule ID to the EASDF. The specific process may be similar to step S102 in the embodiment corresponding to FIG. 3.

In step S203, the PCF issues the message handling rule set to the EASDF, whereby the EASDF handles a received DNS message according to the message handling rule corresponding to the valid rule ID during the PDU session.

For example, the PCF may issue the message handling rule set to the EASDF in response to the rule obtaining request transmitted by the EASDF. Referring to FIG. 9 again, when the EASDF is enabled, the message handling rule set having a node level may be actively requested from the PCF. The PCF may transmit, in response to the rule obtaining request, the message handling rule set to the EASDF in a relevant response message. After receiving the message handling rule set, the EASDF may transmit a response message confirming the reception to the PCF.

It is to be understood that the PCF may also update the message handling rule set or the rule activation condition. When the message handling rule set is updated in the PCF, the PCF may actively transmit the updated message handling rule set to the SMF and the EASDF, whereby the EASDF may handle the subsequently received DNS message according to the updated message handling rule set. The rule update may issue a full-quantity message handling rule set in a full-quantity update manner, including an updated rule and a rule kept unchanged, or issue only updated content in an incremental update manner, without the need to repeat the issuing of non-updated content. The updated content may include modification or deletion of the specific content of one or more message handling rules, or addition of one or more new message handling rules to the message handling rule set, or deletion of one or more existing message handling rules. When the rule activation condition is updated in the PCF, the PCF may actively transmit the updated rule activation condition to the SMF. Subsequently, the SMF may perform relevant determination according to the updated rule activation condition.

A PCF may be supported to generate a message handling rule set having a node level and generate a rule activation condition, to issue the message handling rule set and the rule activation condition to an SMF, and to issue the message handling rule set to an EASDF, whereby the SMF may determine a valid message handling rule according to the rule activation condition when a PDU session is established, and may transmit a valid rule ID corresponding thereto to the EASDF. Subsequently, the EASDF may handle a received DNS message according to the message handling rule corresponding to the valid rule ID during the PDU session. It may be seen therefrom that, after the PCF successfully issues the message handling rule set to the EASDF, if update of the rule is not involved, it is not necessary to trigger requesting and issuing of the message handling rule no matter how many PDU sessions are established subsequently, namely, it is not necessary to frequently issue the message handling rule for each PDU session of each UE. Furthermore, each time a PDU session is established, the SMF is triggered to perform determination based on a rule activation condition so as to select a valid message handling rule suitable for the PDU session from the message handling rule set. Therefore, the enabling of the message handling rule is flexible and controllable, and thus the handling efficiency of DNS messages can be improved.

Figure 10:
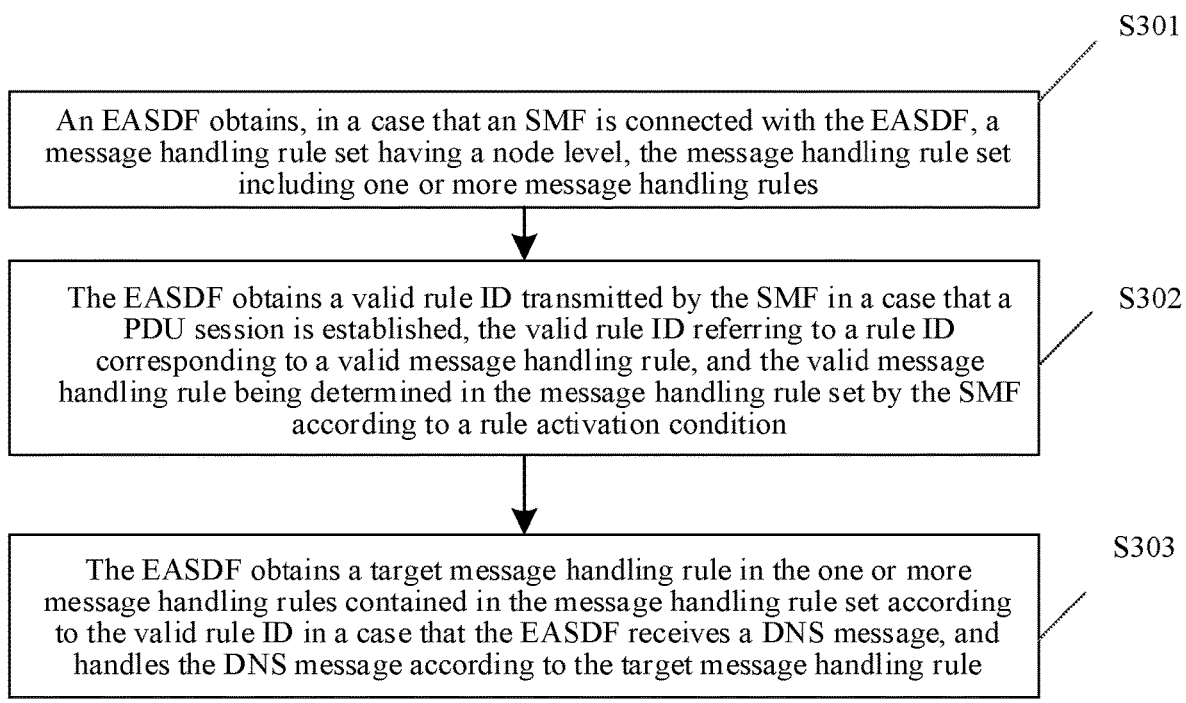
FIG. 10 is a schematic flowchart of a data processing method according to an embodiment of this disclosure.

FIG. 10 is a schematic flowchart of a data processing method according to an embodiment of this disclosure. The data processing method may be performed by an EASDF. As shown in FIG. 10, the data processing method may include at least the following steps S301-S303:

In step S301, the EASDF obtains, in a case that an SMF is connected with the EASDF, a message handling rule set having a node level, the message handling rule set including one or more message handling rules.

For example, when the SMF is connected with the EASDF, the EASDF may obtain a message handling rule set having a node level. A transmitting condition of the message handling rule set having a node level does not depend on the creation of a PDU session, and the message handling rule set may include one or more message handling rules. In conjunction with the embodiments corresponding to FIG. 3 and FIG. 8, the message handling rule set may be generated by the SMF or may be generated by a PCF. Embodiments of this disclosure are not limited thereto.

In step S302, the EASDF obtains a valid rule ID transmitted by the SMF in a case that a PDU session is established, the valid rule ID referring to a rule ID corresponding to a valid message handling rule, and the valid message handling rule being determined in the message handling rule set by the SMF according to a rule activation condition.

For example, the EASDF may obtain a valid rule ID transmitted by the SMF in a case that a PDU session is established. The valid rule ID refers to a rule ID corresponding to a valid message handling rule, and the valid message handling rule is determined in the message handling rule set by the SMF according to a rule activation condition. The specific process may be similar to step S102 in the embodiment corresponding to FIG. 3.

In step S303, the EASDF obtains a target message handling rule in the one or more message handling rules contained in the message handling rule set according to the valid rule ID in a case that the EASDF receives a DNS message, and handles the DNS message according to the target message handling rule.

Each message handling rule in the message handling rule set includes a message detection template and a message handling operation. The message detection template may specifically include one or more of a query request message detection template and a query response message detection template. The message handling operation includes, but is not limited to, one or more of a content reporting operation, a forwarding operation, a cache waiting operation, and a transmitting operation. The forwarding operation may include an option construction operation or an address replacement operation. Furthermore, each message handling rule may also include a rule ID and rule precedence, and may further include at least one of the following: a rule level and a life cycle. The rule ID refers to an ID for distinctively marking each message handling rule. The rule precedence may represent an order in which each message handling rule is executed. The rule level refers to the node level. The life cycle may represent a validity time range of each message handling rule. More specific rule contents may be similar to the description of step S101 in the embodiment corresponding to FIG. 3.

In an implementation, it is assumed that each message handling rule in the message handling rule set includes a rule ID, rule precedence, a life cycle, a message detection template, and a message handling operation. The specific process of obtaining, in a case that the EASDF receives a DNS message, a target message handling rule in the one or more message handling rules contained in the message handling rule set and handling the received DNS message according to the target message handling rule may include: determining, by the EASDF, the message handling rule corresponding to the rule ID identical to the valid rule ID as a valid message handling rule in the one or more message handling rules contained in the message handling rule set, where there may be one or more valid message handling rules.

The EASDF may match the DNS message with the message detection template in the valid message handling rule, and determine the matched valid message handling rule (satisfying a matching condition) as a candidate message handling rule. It is to be understood that there may be one or more candidate message handling rules. Further, the EASDF may obtain a target message handling rule from the candidate message handling rule according to the rule precedence corresponding to the candidate message handling rule. In an implementation, when there is one candidate message handling rule, the candidate message handling rule may be determined as the target message handling rule. In an implementation, when there are multiple candidate message handling rules, the candidate message handling rule with the highest rule precedence among the multiple candidate message handling rules may be determined as the target message handling rule. When there are multiple candidate message handling rules, the multiple candidate message handling rules may be arranged and sorted according to the rule precedence and life cycles corresponding to the multiple candidate message handling rules. That is to say, the rule precedence and the life cycles may be considered comprehensively, whereby the target message handling rule with the highest rule precedence in a target time period may be obtained.

The DNS message and the message detection template in the valid message handling rule may be matched successively according to the order of the rule precedence corresponding to the valid message handling rule, and the first matched valid message handling rule is determined as the target message handling rule. That is, the matching may be performed successively starting from the valid message handling rule with a high precedence, and when a suitable valid message handling rule is matched, the valid message handling rule is determined as the target message handling rule.

According to the definition of the message detection template, the specific process of matching the DNS message with the message detection template in the valid message handling rule may include: First, the EASDF may obtain a message type of a DNS message. If the message type thereof is a query request message type, an FQDN in the DNS message may be obtained. Then the FQDN may be matched with a query request message detection template in the valid message handling rule. Thereafter, the valid message handling rule satisfying a matching condition (such as matched with the FQDN) may be determined as a candidate message handling rule. If the message type of the DNS message is a query response message type, the FQDN in the DNS message may be obtained. Then the FQDN may be matched with a query response message detection template in the valid message handling rule. Thereafter, the valid message handling rule satisfying a matching condition (such as matched with the FQDN) may be determined as a candidate message handling rule. Or, if the message type is a query response message type, an EAS IP address in the DNS message may be obtained. Then the EAS IP address may be matched with a query response message detection template in the valid message handling rule. Thereafter, the valid message handling rule satisfying a matching condition (such as matched with the EAS IP address) may be determined as a candidate message handling rule.

Finally, the EASDF may handle the DNS message according to the message handling operation in the target message handling rule within the life cycle corresponding to the target message handling rule. When there are multiple message handling operations in the target message handling rule, the EASDF may execute the multiple message handling operations in the set order. It is to be understood that the life cycle actually involves the scheduling problem of edge computing. For example, when an edge computing platform is heavily loaded, some beneficial changes may be made by setting the life cycle of certain message handling rules whereby subsequent edge application services are not all routed to the edge computing platform during the time period. The relevant scenarios of this embodiment of this disclosure may be similar to the description of the embodiments corresponding to FIG. 2a to FIG. 2c.

Furthermore, when the message handling rule set is updated, the EASDF may obtain the updated message handling rule set, and then handle the subsequently received DNS message according to the updated message handling rule set.

In an embodiment of this disclosure, when an SMF is connected with an EASDF, the EASDF is supported to obtain a message handling rule set having a node level, to obtain a valid rule ID transmitted by the SMF when a PDU session is established, to obtain a target message handling rule in one or more message handling rules contained in the message handling rule set according to the valid rule ID when a DNS message is received, and to handle the DNS message according to the target message handling rule. It may be seen therefrom that, after the EASDF successfully obtains the message handling rule set, if update of the rule is not involved, it is not necessary to trigger requesting and issuing of the message handling rule no matter how many PDU sessions are established subsequently, namely, it is not necessary to frequently request the message handling rule for each PDU session of each UE. Furthermore, each time a PDU session is established, the SMF is triggered to perform determination based on a rule activation condition so as to select a suitable message handling rule from the message handling rule set according to an indication of the SMF when the EASDF receives a DNS message, thereby performing relevant handling on the DNS message. Therefore, the enabling of the message handling rule can be more flexible and controllable, and thus the handling efficiency of DNS messages can be improved.

Figure 11:
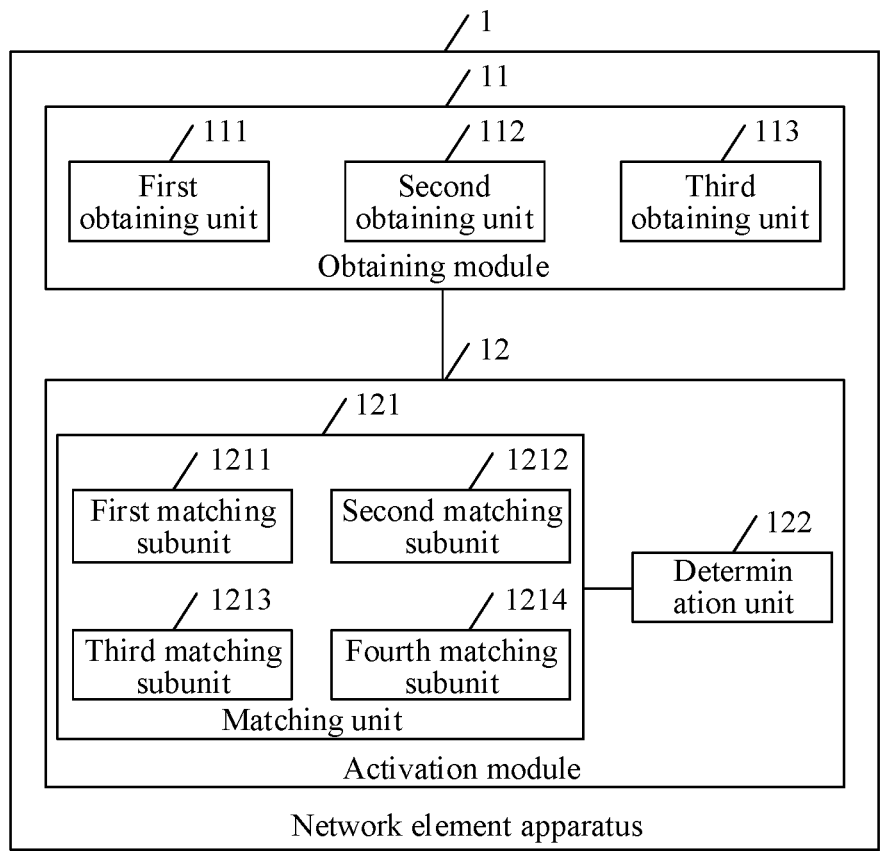
FIG. 11 is a schematic structural diagram of a network element apparatus according to an embodiment of this disclosure.

FIG. 11 is a schematic structural diagram of a network element apparatus according to an embodiment of this disclosure. The network element apparatus may be a computer program (including program codes) running on a network element device. For example, the network element apparatus is application software. The apparatus may be configured to perform corresponding steps in the data processing method according to the embodiments of this disclosure. As shown in FIG. 11, the network element apparatus 1 may include: an obtaining module 11 and an activation module 12. One or more modules, submodules, and/or units of the apparatus can be implemented by processing circuitry, software, or a combination thereof, for example.

The obtaining module 11 is configured to obtain, by an SMF, a message handling rule set having a node level, obtain a rule activation condition, and issue the message handling rule set to an EASDF. The message handling rule set includes one or more message handling rules.

In an implementation, each message handling rule in the message handling rule set includes a message detection template and a message handling operation.

In an implementation, the message detection template includes one or more of a query request message detection template and a query response message detection template. The message handling operation includes one or more of a content reporting operation, a forwarding operation, a cache waiting operation, and a transmitting operation. The forwarding operation includes an option construction operation or an address replacement operation.

In an implementation, each message handling rule further includes a rule ID. The rule ID refers to an ID for distinctively marking each message handling rule.

In an implementation, each message handling rule further includes rule precedence. The rule precedence represents an order in which each message handling rule is executed.

In an implementation, each message handling rule further includes a life cycle and a rule level. The life cycle represents a validity time range of each message handling rule. The rule level refers to the node level.

The activation module 12 is configured to determine, in a case that a PDU session is established, a valid message handling rule in the message handling rule set according to the rule activation condition, determine a rule ID corresponding to the valid message handling rule as a valid rule ID, and transmit the valid rule ID to the EASDF, whereby the EASDF handles a received DNS message according to the message handling rule corresponding to the valid rule ID during the PDU session.

The specific functional implementation of the obtaining module 11 may be similar to step S101 in the embodiment corresponding to FIG. 3, and the specific functional implementation of the activation module 12 may be similar to step S102 in the embodiment corresponding to FIG. 3.

Referring to FIG. 11, the obtaining module 11 may include: a first obtaining unit 111, a second obtaining unit 112 and a third obtaining unit 113.

The first obtaining unit 111 is configured to: generate, by an SMF, a message handling rule set having a node level, and generate a rule activation condition associated with one or more message handling rules in the message handling rule set; and issue, in a case that the SMF is connected with an EASDF, the message handling rule set to the EASDF.

The second obtaining unit 112 is configured to transmit, in a case that an SMF is connected with an EASDF, a rule obtaining request to a PCF by the SMF, whereby the PCF transmits, in response to the rule obtaining request, a message handling rule set having a node level, and transmits a rule activation condition, the message handling rule set and the rule activation condition being generated by the PCF; and receive the message handling rule set and the rule activation condition transmitted by the PCF, and transmit the message handling rule set to the EASDF.

The third obtaining unit 113 is configured to obtain, in a case that an SMF is connected with an EASDF, a message handling rule set having a node level through a UDR, obtain a rule activation condition through the UDR, and transmit the message handling rule set to the EASDF. The message handling rule set and the rule activation condition are generated by a PCF and stored to the UDR.

The specific functional implementations of the first obtaining unit 111, the second obtaining unit 112 and the third obtaining unit 113 may be similar to step S101 in the embodiment corresponding to FIG. 3.

In an implementation, each message handling rule corresponds to one or more rule activation conditions.

Referring to FIG. 11, the activation module 12 may include: a matching unit 121 and a determination unit 122.

The matching unit 121 is configured to match, in a case that a PDU session is established, the PDU session with one or more rule activation conditions corresponding to each message handling rule in the message handling rule set, and determine the message handling rule associated with the matched rule activation condition as a valid message handling rule.

The determination unit 122 is configured to determine a rule ID corresponding to the valid message handling rule as a valid rule ID, and transmit the valid rule ID to the EASDF.

The specific functional implementation of the matching unit 121 may be similar to step S1021 in the embodiment corresponding to FIG. 7, and the specific functional implementation of the determination unit 122 may be similar to step S1022 in the embodiment corresponding to FIG. 7.

In an implementation, the rule activation condition includes S-NSSAI.

Referring to FIG. 11, the matching unit 121 may include: a first matching subunit 1211.

The first matching subunit 1211 is configured to obtain a network slice ID corresponding to the PDU session, match the network slice ID with each rule activation condition containing the S-NSSAI, determine the successfully matched rule activation condition as a target rule activation condition, and determine a message handling rule associated with the target rule activation condition as a valid message handling rule.

The specific functional implementation of the first matching subunit 1211 may be similar to step S1021 in the embodiment corresponding to FIG. 7.

In an implementation, the rule activation condition includes a DNN.

Referring to FIG. 11, the matching unit 121 may include: a second matching subunit 1212.

The second matching subunit 1212 is configured to obtain a target DNN corresponding to the PDU session, match the target DNN with each rule activation condition containing the DNN, determine the successfully matched rule activation condition as a target rule activation condition, and determine a message handling rule associated with the target rule activation condition as a valid message handling rule.

The specific functional implementation of the second matching subunit 1212 may be similar to step S1021 in the embodiment corresponding to FIG. 7.

In an implementation, the rule activation condition includes an SSC mode.

Referring to FIG. 11, the matching unit 121 may include: a third matching subunit 1213.

The third matching subunit 1213 is configured to obtain a target SSC mode corresponding to the PDU session, match the target SSC mode with each rule activation condition containing the SSC mode, determine the successfully matched rule activation condition as a target rule activation condition, and determine a message handling rule associated with the target rule activation condition as a valid message handling rule.

The specific functional implementation of the third matching subunit 1213 may be similar to step S1021 in the embodiment corresponding to FIG. 7.

In an implementation, the rule activation condition includes user identity information.

Referring to FIG. 11, the matching unit 121 may include: a fourth matching subunit 1214.

The fourth matching subunit 1214 is configured to obtain target user identity information corresponding to the PDU session, match the target user identity information with each rule activation condition containing the user identity information, determine the successfully matched rule activation condition as a target rule activation condition, and determine a message handling rule associated with the target rule activation condition as a valid message handling rule.

The specific functional implementation of the fourth matching subunit 1214 may be similar to step S1021 in the embodiment corresponding to FIG. 7.

An SMF may be supported to obtain a message handling rule set having a node level, to obtain a rule activation condition, and to issue the message handling rule set to an EASDF. Then the SMF may determine a valid message handling rule according to the rule activation condition when a PDU session is established, and may transmit a valid rule ID corresponding thereto to the EASDF. Subsequently, the EASDF may handle a received DNS message according to the message handling rule corresponding to the valid rule ID during the PDU session. It may be seen therefrom that, after the SMF successfully issues the message handling rule set to the EASDF, if update of the rule is not involved, it is not necessary to trigger requesting and issuing of the message handling rule no matter how many PDU sessions are established subsequently, namely, it is not necessary to frequently issue the message handling rule for each PDU session of each UE, thus greatly reducing the amount of interaction between the SMF and the EASDF. Furthermore, each time a PDU session is established, the SMF is triggered to perform determination based on a rule activation condition so as to select a valid message handling rule suitable for the PDU session from the message handling rule set. Therefore, the enabling of the message handling rule can be more flexible and controllable, and thus the handling efficiency of DNS messages can be improved.

Figure 12:
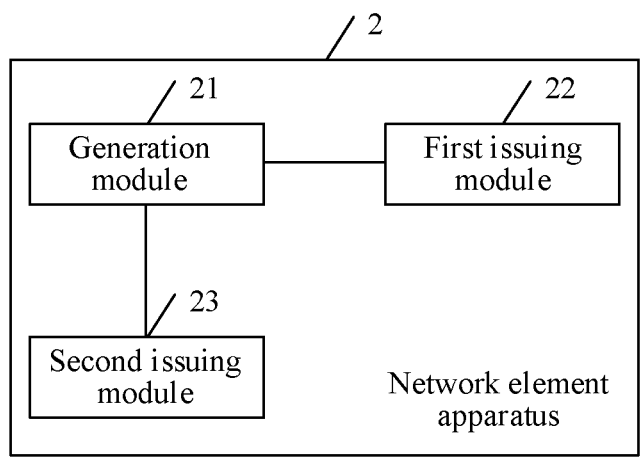
FIG. 12 is a schematic structural diagram of a network element apparatus according to an embodiment of this disclosure.

FIG. 12 is a schematic structural diagram of a network element apparatus according to an embodiment of this disclosure. The network element apparatus may be a computer program (including program codes) running on a network element device. For example, the network element apparatus is application software. The apparatus may be configured to perform corresponding steps in the data processing method according to the embodiments of this disclosure. As shown in FIG. 12, the network element apparatus 2 may include: a generation module 21, a first issuing module 22 and a second issuing module 23. One or more modules, submodules, and/or units of the apparatus can be implemented by processing circuitry, software, or a combination thereof, for example.

The generation module 21 is configured to generate, by a PCF, a message handling rule set having a node level, and generate a rule activation condition. The message handling rule set includes one or more message handling rules.

The first issuing module 22 is configured to issue the message handling rule set and the rule activation condition to an SMF, whereby the SMF determines, in a case that a PDU session is subsequently established, a valid message handling rule in the message handling rule set according to the rule activation condition, determines a rule ID corresponding to the valid message handling rule as a valid rule ID, and transmits the valid rule ID to an EASDF.

The second issuing module 23 is configured to issue the message handling rule set to the EASDF, whereby the EASDF handles a received DNS message according to the message handling rule corresponding to the valid rule ID during the PDU session.

The specific functional implementation of the generation module 21 may be similar to step S201 in the embodiment corresponding to FIG. 8, the specific functional implementation of the first issuing module 22 may be similar to step S202 in the embodiment corresponding to FIG. 8, and the specific functional implementation of the second issuing module 23 may be similar to step S203 in the embodiment corresponding to FIG. 8.

A PCF may be supported to generate a message handling rule set having a node level and generate a rule activation condition, to issue the message handling rule set and the rule activation condition to an SMF, and to issue the message handling rule set to an EASDF, whereby the SMF may determine a valid message handling rule according to the rule activation condition when a PDU session is established, and may transmit a valid rule ID corresponding thereto to the EASDF. Subsequently, the EASDF may handle a received DNS message according to the message handling rule corresponding to the valid rule ID during the PDU session. It may be seen therefrom that, after the PCF successfully issues the message handling rule set to the EASDF, if update of the rule is not involved, it is not necessary to trigger requesting and issuing of the message handling rule no matter how many PDU sessions are established subsequently, namely, it is not necessary to frequently issue the message handling rule for each PDU session of each UE. Furthermore, each time a PDU session is established, the SMF is triggered to perform determination based on a rule activation condition so as to select a valid message handling rule suitable for the PDU session from the message handling rule set. Therefore, the enabling of the message handling rule can be more flexible and controllable, and thus the handling efficiency of DNS messages can be improved.

Figure 13:
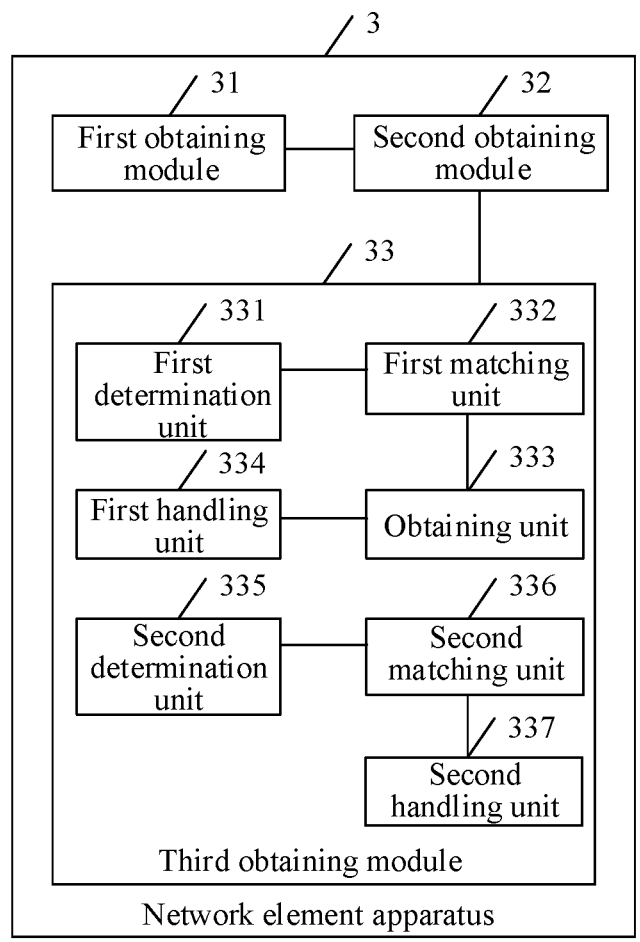
FIG. 13 is a schematic structural diagram of a network element apparatus according to an embodiment of this disclosure.

FIG. 13 is a schematic structural diagram of a network element apparatus according to an embodiment of this disclosure. The network element apparatus may be a computer program (including program codes) running on a network element device. For example, the network element apparatus is application software. The apparatus may be configured to perform corresponding steps in the data processing method according to the embodiments of this disclosure. As shown in FIG. 13, the network element apparatus 3 may include: a first obtaining module 31, a second obtaining module 32 and a third obtaining module 33. One or more modules, submodules, and/or units of the apparatus can be implemented by processing circuitry, software, or a combination thereof, for example.

The first obtaining module 31 is configured to obtain, in a case that an SMF is connected with an EASDF, a message handling rule set having a node level by the EASDF. The message handling rule set includes one or more message handling rules.

The second obtaining module 32 is configured to obtain, in a case that a PDU session is established, a valid rule ID transmitted by the SMF. The valid rule ID refers to a rule ID corresponding to a valid message handling rule. The valid message handling rule is determined in the message handling rule set by the SMF according to a rule activation condition.

The third obtaining module 33 is configured to obtain, in a case that the EASDF receives a DNS message, a target message handling rule in the one or more message handling rules contained in the message handling rule set according to the valid rule ID, and handle the DNS message according to the target message handling rule.

The specific functional implementation of the first obtaining module 31 may be similar to step S301 in the embodiment corresponding to FIG. 10, the specific functional implementation of the second obtaining module 32 may be similar to step S302 in the embodiment corresponding to FIG. 10, and the specific functional implementation of the third obtaining module 33 may be similar to step S303 in the embodiment corresponding to FIG. 10.

In an implementation, each message handling rule in the message handling rule set includes a rule ID, rule precedence, a life cycle, a message detection template, and a message handling operation. The rule ID refers to an ID for distinctively marking each message handling rule.

Referring to FIG. 13, the third obtaining module 33 may include: a first determination unit 331, a first matching unit 332, an obtaining unit 333, and a first handling unit 334.

The determination unit 331 is configured to determine a message handling rule corresponding to a rule ID identical to the valid rule ID in the one or more message handling rules as the valid message handling rule.

The matching unit 332 is configured to match the DNS message with the message detection template in the valid message handling rule, and determine the matched valid message handling rule as a candidate message handling rule.

The obtaining unit 333 is configured to obtain a target message handling rule from the candidate message handling rule according to the rule precedence corresponding to the candidate message handling rule.

The handling unit 334 is configured to handle the DNS message according to the message handling operation in the target message handling rule within the life cycle corresponding to the target message handling rule.

The specific functional implementations of the determination unit 331, the matching unit 332, the obtaining unit 333, and the handling unit 334 may be similar to step S303 in the embodiment corresponding to FIG. 10.

In an implementation, each message handling rule in the message handling rule set includes a rule ID, rule precedence, a life cycle, a message detection template, and a message handling operation. The rule ID refers to an ID for distinctively marking each message handling rule.

Referring to FIG. 13, the third obtaining module 33 may include: a second determination unit 335, a second matching unit 336 and a second handling unit 337.

The second determination unit 335 is configured to determine a message handling rule corresponding to a rule ID identical to the valid rule ID in the one or more message handling rules as the valid message handling rule.

The second matching unit 336 is configured to successively match the DNS message with the message detection template in the valid message handling rule according to an order of rule precedence corresponding to the valid message handling rule, and determine the first matched valid message handling rule as a target message handling rule.

The second handling unit 337 is configured to handle the DNS message according to the message handling operation in the target message handling rule within the life cycle corresponding to the target message handling rule.

The specific functional implementations of the second determination unit 335, the second matching unit 336 and the second handling unit 337 may be similar to step S303 in the embodiment corresponding to FIG. 10, and the first determination unit 331 and the second determination unit 335 may be combined into one determination unit.

In an embodiment of this disclosure, when an SMF is connected with an EASDF, the EASDF is supported to obtain a message handling rule set having a node level, to obtain a valid rule ID transmitted by the SMF when a PDU session is established, to obtain a target message handling rule in one or more message handling rules contained in the message handling rule set according to the valid rule ID when a DNS message is received, and to handle the DNS message according to the target message handling rule. It may be seen therefrom that, after the EASDF successfully obtains the message handling rule set, if update of the rule is not involved, it is not necessary to trigger requesting and issuing of the message handling rule no matter how many PDU sessions are established subsequently, namely, it is not necessary to frequently request the message handling rule for each PDU session of each UE. Furthermore, each time a PDU session is established, the SMF is triggered to perform determination based on a rule activation condition so as to select a suitable message handling rule from the message handling rule set according to an indication of the SMF when the EASDF receives a DNS message, thereby performing relevant handling on the DNS message. Therefore, the enabling of the message handling rule can be more flexible and controllable, and thus the handling efficiency of DNS messages can be improved.

Figure 14:
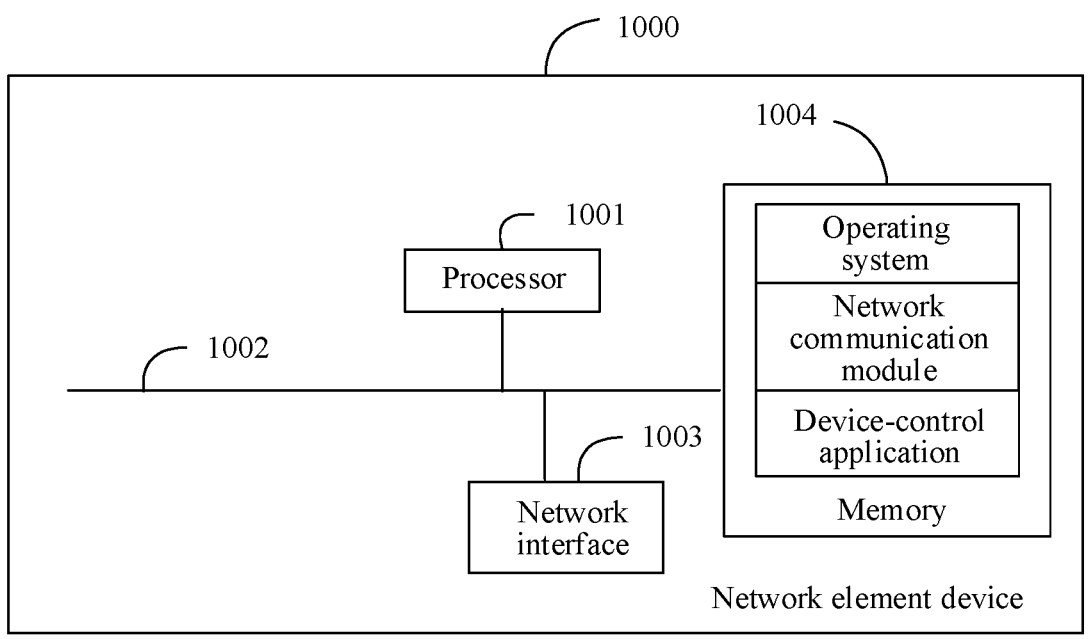
FIG. 14 is a schematic structural diagram of a network element device according to an embodiment of this disclosure.

FIG. 14 is a schematic structural diagram of a network element device according to an embodiment of this disclosure. As shown in FIG. 14, the network element device 1000 may include: a processor 1001, a network interface 1003, and a memory 1004. Furthermore, the network element device 1000 may further include: at least one communication bus 1002. The communication bus 1002 is configured to implement connection and communication between the components. The network interface 1003 may include a standard wired interface and a standard wireless interface (such as a WI-FI interface). The memory 1004 may be a high-speed random access memory (RAM), or may be a non-volatile memory, for example, at least one magnetic disk memory. The memory 1004 may be at least one storage apparatus that is located far away from the foregoing processor 1001. As shown in FIG. 14, the memory 1004 used as a computer-readable storage medium may include an operating system, a network communication module, and a device-control application. In this embodiment of this disclosure, the network element device 1000 may be an SMF.

In the network element device 1000 as shown in FIG. 14, the network interface 1003 may provide a network communication network element. And the processor 1001 may be configured to invoke the device-control application stored in the memory 1004 to enable the network element device 1000 to:
  obtain a message handling rule set having a node level, obtain a rule activation condition, and issue the message handling rule set to an EASDF, the message handling rule set including one or more message handling rules; and
  determine, in a case that a PDU session is established, a valid message handling rule in the message handling rule set according to the rule activation condition, determine a rule ID corresponding to the valid message handling rule as a valid rule ID, and transmit the valid rule ID to the EASDF, whereby the EASDF handles a received DNS message according to the message handling rule corresponding to the valid rule ID during the PDU session.

It is to be understood that the network element device 1000 described in the embodiments of this disclosure may perform the description of the data processing method in the foregoing embodiment corresponding to any of FIG. 3 and FIG. 7.

Figure 15:
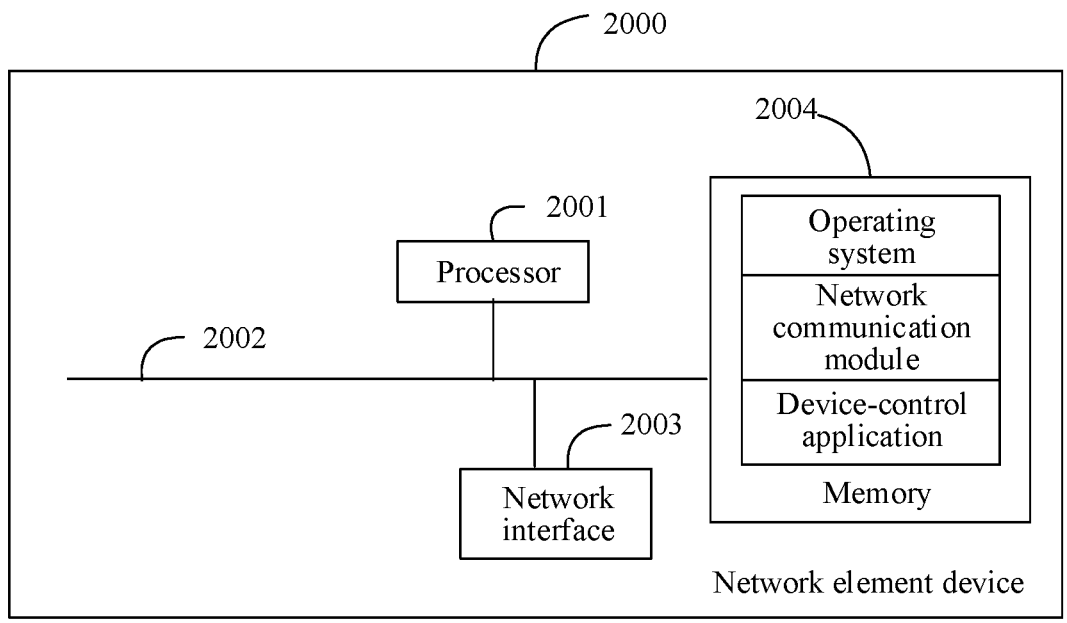
FIG. 15 is a schematic structural diagram of a network element device according to an embodiment of this disclosure.

FIG. 15 is a schematic structural diagram of a network element device according to an embodiment of this disclosure. As shown in FIG. 15, the network element device 2000 may include: a processor 2001, a network interface 2003, and a memory 2004. Furthermore, the network element device 2000 may further include: at least one communication bus 2002. The communication bus 2002 is configured to implement connection and communication between the components. The network interface 2003 may include a standard wired interface and a standard wireless interface (such as a WI-FI interface). The memory 2004 may be a high-speed RAM, or may be a non-volatile memory, for example, at least one magnetic disk memory. The memory 2004 may be at least one storage apparatus that is located far away from the foregoing processor 2001. As shown in FIG. 15, the memory 2004 used as a computer-readable storage medium may include an operating system, a network communication module, and a device-control application. In an embodiment of this disclosure, the network element device 2000 may be a PCF.

In the network element device 2000 as shown in FIG. 15, the network interface 2003 may provide a network communication network element. And the processor 2001 may be configured to invoke the device-control application stored in the memory 2004 to enable the network element device 2000 to:

generate a message handling rule set having a node level, and generate a rule activation condition, the message handling rule set including one or more message handling rules;

issue the message handling rule set and the rule activation condition to an SMF, whereby the SMF determines, in a case that a PDU session is subsequently established, a valid message handling rule in the message handling rule set according to the rule activation condition, determines a rule ID corresponding to the valid message handling rule as a valid rule ID, and transmits the valid rule ID to an EASDF; and issue the message handling rule set to the EASDF, whereby the EASDF handles a received DNS message according to the message handling rule corresponding to the valid rule ID during the PDU session.

It is to be understood that the network element device 2000 described in the embodiments of this disclosure may perform the description of the data processing method in the foregoing embodiment corresponding to FIG. 8.

Figure 16:
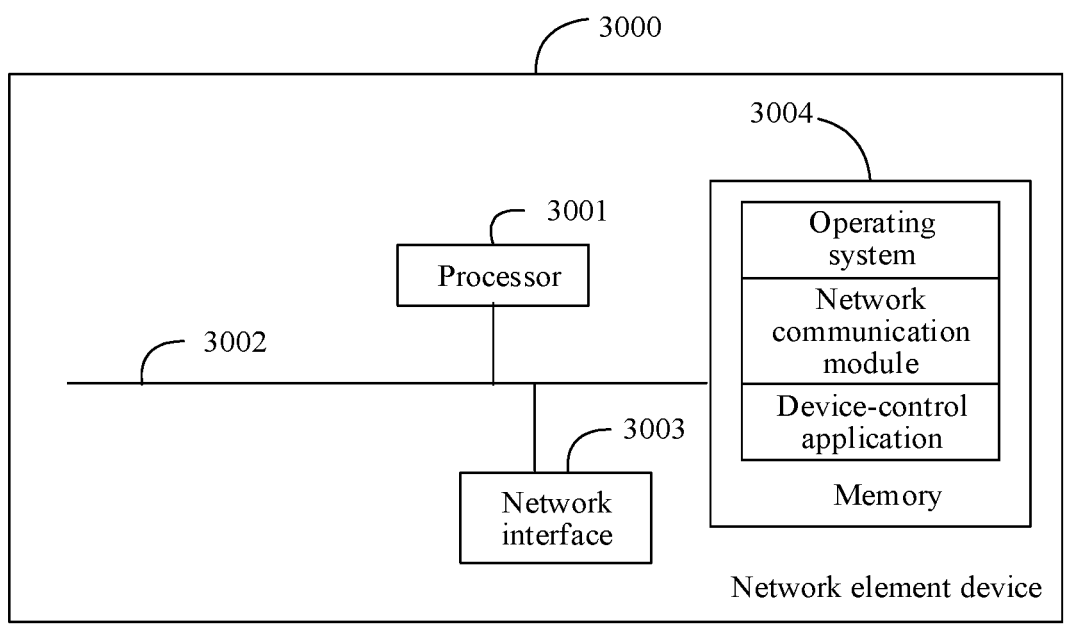
FIG. 16 is a schematic structural diagram of a network element device according to an embodiment of this disclosure.

FIG. 16 is a schematic structural diagram of a network element device according to an embodiment of this disclosure. As shown in FIG. 16, the network element device 3000 may include: a processor 3001, a network interface 3003, and a memory 3004. Furthermore, the network element device 3000 may further include: at least one communication bus 3002. The communication bus 3002 is configured to implement connection and communication between the components. The network interface 3003 may include a standard wired interface and a standard wireless interface (such as a WI-FI interface). The memory 3004 may be a high-speed RAM, or may be a non-volatile memory, for example, at least one magnetic disk memory. The memory 3004 may be at least one storage apparatus that is located far away from the foregoing processor 3001. As shown in FIG. 16, the memory 3004 used as a computer-readable storage medium may include an operating system, a network communication module, and a device-control application. In this embodiment of this disclosure, the network element device 3000 may be an EASDF.

In the network element device 3000 as shown in FIG. 16, the network interface 3003 may provide a network communication network element. And the processor 3001 may be configured to invoke the device-control application stored in the memory 3004 to enable the network element device 3000 to:

obtain, in a case that a connection is established with an SMF, a message handling rule set having a node level, the message handling rule set including one or more message handling rules;

obtain, in a case that a PDU session is established, a valid rule ID transmitted by the SMF, the valid rule ID referring to a rule ID corresponding to a valid message handling rule, and the valid message handling rule being determined in the message handling rule set by the SMF according to a rule activation condition; and obtain, in a case that a DNS message is received, a target message handling rule in the one or more message handling rules contained in the message handling rule set according to the valid rule ID, and handle the DNS message according to the target message handling rule.

It is to be understood that the function device 3000 described in the embodiments of this disclosure may perform the description of the data processing method in the foregoing embodiment corresponding to FIG. 10.

Furthermore, embodiments of this disclosure also provide a computer-readable storage medium, such as a non-transitory computer-readable storage medium. Computer programs executed by the aforementioned network element apparatus 1, network element apparatus 2 and network element apparatus 3 are stored in the computer-readable storage medium. The computer programs include program instructions. When a processor executes the program instructions, the description of the data processing method in the foregoing embodiment corresponding to any of FIG. 3, FIG. 7, FIG. 8, and FIG. 10 can be performed. For technical details that are not disclosed in the computer-readable storage medium embodiment involved in this disclosure, reference can be made to the description of the method embodiments of this disclosure for examples.

The computer-readable storage medium may be the network element apparatus according to any of the foregoing embodiments or an internal storage unit of the network element device, for example, a hard disk or an internal memory of the network element device. The computer-readable storage medium may also be an external storage device of the network element device, such as a plug-in hard disk, a smart media card (SMC), a secure digital (SD) card, or a flash card provided on the network element device. Further, the computer-readable storage medium may also include both the internal storage unit and the external storage device of the network element device. The computer-readable storage medium is configured to store the computer program and other programs and data required by the network element device. The computer-readable storage medium may be further configured to temporarily store data that has been outputted or is to be outputted.

Furthermore, embodiments of this disclosure also provide a computer program product or a computer program. The computer program product or the computer program includes computer instructions. The computer instructions are adapted to be loaded by a processor to perform the method in the foregoing embodiment corresponding to any of FIG. 3, FIG. 7, FIG. 8, and FIG. 10.

The foregoing processor, which is an example of processing circuitry, may be a processor in a network element device, and the computer instructions may be stored in a computer-readable storage medium of the network element device. The processor of the network element device reads the computer instructions from the computer-readable storage medium. The processor executes the computer instructions, whereby the network element device performs the method in the foregoing embodiment corresponding to any of FIG. 3, FIG. 7, FIG. 8, and FIG. 10.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The terms "first", "second", and the like in the specification, in the claims and in the drawings of the embodiments of this disclosure are used for distinguishing between different objects and not necessarily for describing a particular sequence. Furthermore, the terms "include" and any variations thereof are intended to cover a non-exclusive inclusion. For example, a process, method, apparatus, product, or device that contains a list of steps or units is not limited to the listed steps or modules, but may include steps or modules not listed, or may include other step units inherent to such process, method, apparatus, product, or device.

A person of ordinary skill in the art may be aware that, units and algorithm steps of the examples described in the disclosed embodiments in this specification may be implemented by electronic hardware, computer software, or a combination thereof. To describe the interchangeability between the hardware and the software, the disclosure has generally described compositions and steps of the examples based on network elements. Whether the network elements are executed in the manner of hardware or software depends on particular applications and design constraint conditions of the technical solutions. A person skilled in the art may use different methods to implement the described network elements for each particular application, but it is not to be considered that the implementation goes beyond the scope of this disclosure.

What is disclosed above is merely exemplary embodiments of this disclosure, and certainly is not intended to limit the scope of the claims of this disclosure. Therefore, equivalent variations made in accordance with the claims of this disclosure shall fall within the scope of this disclosure.

What is claimed is:

1. A data processing method, comprising:
   obtaining, by a session management function (SMF) of a core network, a message handling rule set and rule activation condition information, the message handling rule set including at least one message handling rule;
   sending the message handling rule set to an edge application server discovery function (EASDF) of the core network; and
   based on a protocol data unit (PDU) session being established,
      determining, by the SMF, a valid message handling rule in the message handling rule set according to the rule activation condition information,
      determining a rule identifier (ID) corresponding to the valid message handling rule, and
      sending the determined rule ID to the EASDF, the EASDF being configured to process a domain name system (DNS) message according to the message handling rule corresponding to the determined rule ID during the PDU session.

2. The method according to claim 1, wherein
   the obtaining the message handling rule set includes generating the message handling rule set corresponding to a node level;
   the obtaining the rule activation condition information includes generating the rule activation condition information associated with the at least one message handling rule in the message handling rule set; and
   the sending the message handling rule set includes issuing, by the SMF and based on the SMF being connected with the EASDF, the message handling rule set to the EASDF.

3. The method according to claim 1, wherein the obtaining the message handling rule set comprises:
   sending, by the SMF, a rule obtaining request to a policy control function (PCF) of the core network, and
   receiving, by the SMF, the message handling rule set and the rule activation condition from the PCF.

4. The method according to claim 1, wherein
   the obtaining the message handling rule set includes obtaining the message handling rule set through a unified data repository (UDR);
   the obtaining the rule activation condition information includes obtaining the rule activation condition information through the UDR; and
   the message handling rule set and the rule activation condition information are generated by a policy control function (PCF) and stored in the UDR.

5. The method according to claim 1, wherein each of the at least one message handling rule in the message handling rule set includes message detection template information and message handling operation information.

6. The method according to claim 5, wherein
   the message detection template information of one of the at least one message handling rule includes at least one of a query request message detection template or a query response message detection template; and
   the message handling operation information of the one of the at least one message handling rule includes at least one of a content reporting operation, a forwarding operation, a cache waiting operation, or a transmitting operation, the forwarding operation including an option construction operation or an address replacement operation.

7. The method according to claim 5, wherein each of the at least one message handling rule in the message handling rule set includes rule precedence information, the rule precedence information indicating an order in which the at least one message handling rule in the message handling rule set is executed.

8. The method according to claim 5, wherein each of the at least one message handling rule in the message handling rule set includes life cycle information and rule level information, the life cycle information indicating a validity time range of each of the at least one message handling rule in the message handling rule set, and the rule level information indicating a node level of the message handling rule set.

9. The method according to claim 5, wherein each of the at least one message handling rule in the message handling rule set is associated with a different rule ID.

10. The method according to claim 9, wherein
    each of the at least one message handling rule in the message handling rule set corresponds to one or more rule activation conditions in the rule activation condition information; and
    the determining the valid message handling rule comprises:
       matching, by the SMF when a PDU session is established, the PDU session with one of the at least one message handling rule based on the one or more rule activation conditions corresponding to the one of the at least one message handling rule in the message handling rule set by the SMF, and
       determining the matched message handling rule as the valid message handling rule.

11. The method according to claim 10, wherein
    the rule activation condition information includes single network slice selection assistance information (S-NSSAI); and the matching the PDU session comprises:
obtaining, by the SMF, a network slice ID corresponding to the PDU session,
matching the network slice ID with a rule activation condition in the rule activation condition information that includes the S-NSSAI,
determining the matched rule activation condition as a target rule activation condition, and
determining the message handling rule associated with the target rule activation condition as the valid message handling rule.

12. The method according to claim 10, wherein
the rule activation condition information includes a data network name (DNN); and
the matching the PDU session comprises:
obtaining, by the SMF, a target DNN corresponding to the PDU session,
matching the target DNN with a rule activation condition in the rule activation condition information that includes the DNN, and
determining the message handling rule associated with the matched rule activation condition as the valid message handling rule.

13. The method according to claim 10, wherein
the rule activation condition information includes a session and service continuity (SSC) mode; and
the matching the PDU session comprises:
obtaining, by the SMF, a target SSC mode corresponding to the PDU session,
matching the target SSC mode with a rule activation condition in the rule activation condition information that includes the SSC mode, and
determining the message handling rule associated with the matched rule activation condition as the valid message handling rule.

14. The method according to claim 10, wherein
the rule activation condition information includes user identity information; and
the matching the PDU session comprises:
obtaining, by the SMF, target user identity information corresponding to the PDU session,
matching the target user identity information with a rule activation condition in the rule activation condition information that includes the user identity information, and
determining the message handling rule associated with the matched rule activation condition as the valid message handling rule.

15. A data processing method, comprising:
obtaining, by an edge application server discovery function (EASDF) of a core network based on a session management function (SMF) of the core network being connected with the EASDF, a message handling rule set, the message handling rule set including at least one message handling rule;
obtaining, by the EASDF, a valid rule identifier (ID) from the SMF based on a protocol data unit (PDU) session being established, the valid rule ID corresponding to a valid message handling rule, and the valid message handling rule being determined from the message handling rule set by the SMF according to rule activation condition information;
obtaining, by the EASDF, a target message handling rule in the at least one handling rule included in the message handling rule set according to the valid rule ID based on the EASDF receiving a domain name system (DNS) message; and
processing the DNS message according to the target message handling rule.

16. The method according to claim 15, wherein
each of the at least one message handling rule in the message handling rule set includes a rule ID, rule precedence information, life cycle information, message detection template information, and message handling operation information, the rule ID identifying the respective message handling rule; and
the obtaining the target message handling rule includes:
determining, by the EASDF, the valid message handling rule corresponding to the valid rule ID in the at least one message handling rule,
matching, by the EASDF, the DNS message with the message detection template information in the valid message handling rule,
determining the matched valid message handling rule as a candidate message handling rule, and
obtaining, by the EASDF, the target message handling rule from the candidate message handling rule according to the rule precedence information corresponding to the candidate message handling rule; and
the processing the DNS message includes processing, by the EASDF, the DNS message according to the message handling operation information in the target message handling rule based on the life cycle information corresponding to the target message handling rule.

17. The method according to claim 15, wherein
each of the at least one message handling rule in the message handling rule set includes a rule ID, rule precedence information, life cycle information, message detection template information, and message handling operation information, the rule ID identifying the respective message handling rule; and
the obtaining the target message handling rule includes:
determining, by the EASDF, the valid message handling rule corresponding to the valid rule ID in the at least one message handling rule,
successively matching, by the EASDF, the DNS message with the message detection template information in the valid message handling rule according to an order indicated by the rule precedence information corresponding to the valid message handling rule, and
determining the valid message handling rule as the target message handling rule; and
the processing the DNS message includes processing, by the EASDF, the DNS message according to the message handling operation information in the target message handling rule based on the life cycle information corresponding to the target message handling rule.

18. A network element device, comprising: a processor, a memory and a network interface,
the processor being connected to the memory and the network interface, the network interface being configured to provide a data communication network element, the memory being configured to store program codes, and the processor being configured to invoke the program codes whereby the network element device performs the method according to claim 1.

* * * * *